(12) United States Patent  
Keijer et al.

(10) Patent No.: US 11,428,798 B2  
(45) Date of Patent: Aug. 30, 2022

(54) RADAR BASED SYSTEM AND METHOD FOR DETECTION OF AN OBJECT AND GENERATION OF PLOTS HOLDING RADIAL VELOCITY DATA, AND SYSTEM FOR DETECTION AND CLASSIFICATION OF UNMANNED AERIAL VEHICLES, UAVS

(71) Applicant: ROBIN RADAR FACILITIES BV, The Hague (NL)

(72) Inventors: Wouter Keijer, Rijswijk (NL); Gerben Pakkert, Delft (NL)

(73) Assignee: ROBIN RADAR FACILITIES BV, The Hague (NL)

( * ) Notice: Subject to any disclaimer, the term of this patent is extended or adjusted under 35 U.S.C. 154(b) by 262 days.

(21) Appl. No.: 16/759,194

(22) PCT Filed: Nov. 2, 2018

(86) PCT No.: PCT/EP2018/079996  
§ 371 (c)(1),  
(2) Date: Apr. 24, 2020

(87) PCT Pub. No.: WO2019/091867  
PCT Pub. Date: May 16, 2019

(65) Prior Publication Data  
US 2020/0326418 A1   Oct. 15, 2020

(30) Foreign Application Priority Data

Nov. 13, 2017   (DK) .............................. PA201770852  
Nov. 13, 2017   (DK) .............................. PA201770853  
(Continued)

(51) Int. Cl.  
*G01S 13/72*   (2006.01)  
*G01S 13/93*   (2020.01)  
(Continued)

(52) U.S. Cl.  
CPC ............ *G01S 13/723* (2013.01); *G01S 7/415* (2013.01); *G01S 13/584* (2013.01); *G01S 13/933* (2020.01); *B64C 39/024* (2013.01)

(58) Field of Classification Search  
CPC ...... G01S 13/723; G01S 7/415; G01S 13/584; G01S 13/933; G01S 13/32; G01S 13/536;  
(Continued)

(56) References Cited

U.S. PATENT DOCUMENTS

2009/0058713 A1   3/2009   Okunishi et al.  
2010/0073218 A1   3/2010   Stockmann  
(Continued)

FOREIGN PATENT DOCUMENTS

AU            654547 B2      11/1994  
DE     102016212794 A1 *   1/2018   ............. G01S 13/52  
(Continued)

OTHER PUBLICATIONS

Schroeder, Christoph T. and Hermann Rohling. "X-band FMCW radar system with variable chirp duration." 2010 IEEE Radar Conference (2010): 1255-1259. (Year: 2010).*  
(Continued)

*Primary Examiner* — Erin F Heard  
*Assistant Examiner* — Juliana Cross  
(74) *Attorney, Agent, or Firm* — Nordic Patent Service

(57) ABSTRACT

A Frequency Modulated Continuous Wave, FMCW, radar system that includes one or more antennas configured to transmit and receive FMCW radar wave signals for scanning for objects within a full circular detection coverage range, and processing circuitry configured to provide scan data based on transmitted and received FMCW radar signals and azimuth position of the antenna(s). The processing circuitry is configured to generate first type radar plots that holds range, radial velocity and return energy data for one or more  
(Continued)

detected objects, and second type radar plots that holds azimuth, range and return energy data for one or more detected objects. The processing circuitry is also configured to generate full data type radar plots by combining first and second type radar plots having corresponding range data, whereby each full data type radar plot holds azimuth, range, radial velocity and return energy data for one or more detected objects.

21 Claims, 20 Drawing Sheets

(30) Foreign Application Priority Data

Nov. 13, 2017 (DK) .............................. PA201770854
Nov. 13, 2017 (DK) .............................. PA201770855

(51) Int. Cl.
*G01S 7/41* (2006.01)
*G01S 13/58* (2006.01)
*B64C 39/02* (2006.01)
*G01S 13/933* (2020.01)

(58) Field of Classification Search
CPC . G01S 13/72; G01S 7/38; G01S 13/42; G01S 13/931; G01S 2013/0254; G01S 2013/0245; G01S 13/89; G01S 13/4463; G01S 13/88; G01S 13/34; G01S 13/5244; G01S 7/352; G01S 13/003; G01S 13/726; G01S 13/86; G01S 13/935; G01S 13/91; G01S 7/414; G01S 13/426; G01S 13/66; G01S 13/9029; G01S 7/003; G01S 13/4472; G01S 13/953; G01S 7/412; G01S 13/582; G01S 7/021; G01S 7/032; G01S 7/023; G01S 7/35; G01S 13/90; G01S 7/354; G01S 13/343; G01S 13/87; G01S 13/883; G01S 3/782; G01S 13/04; G01S 13/48; G01S 13/867; G01S 17/931; G01S 7/03; G01S 7/411; B64C 39/024
See application file for complete search history.

(56) References Cited

U.S. PATENT DOCUMENTS

| | | | |
|---|---|---|---|
| 2010/0149020 A1 | 6/2010 | Arnold et al. | |
| 2016/0025850 A1 | 1/2016 | Rigsby et al. | |
| 2016/0069994 A1 | 3/2016 | Allen et al. | |
| 2017/0254882 A1 | 9/2017 | Malik | |
| 2017/0285158 A1 | 10/2017 | Halbert et al. | |
| 2019/0363430 A1* | 11/2019 | Wang | G01S 13/865 |
| 2021/0255303 A1* | 8/2021 | Laghezza | G01S 7/415 |

FOREIGN PATENT DOCUMENTS

| | | | | |
|---|---|---|---|---|
| DE | 102016224573 A1 * | 6/2018 | | |
| DE | 102019108927 A1 * | 10/2019 | | B60J 5/04 |
| DK | 179788 B1 | 6/2019 | | |
| DK | 201770854 A1 | 6/2019 | | |
| EP | 2428814 A1 | 3/2012 | | |
| EP | 2866048 B1 | 3/2019 | | |
| JP | 6816201 B2 * | 1/2021 | | G01S 13/08 |
| JP | 2021004874 A * | 1/2021 | | |
| JP | 6833135 B2 * | 2/2021 | | |
| WO | 2008094172 A2 | 8/2008 | | |
| WO | WO-2012149035 A2 * | 11/2012 | | G01S 13/04 |
| WO | 2012149035 A3 | 1/2013 | | |
| WO | 2017207716 A1 | 12/2017 | | |

OTHER PUBLICATIONS

Danish Patent and Trademark Office, 1st Technical Examination of Application / Search Report, Application No. PA 201770854, dated Apr. 4, 2018, 9 pages.
Danish Patent and Trademark Office, 2nd Technical Examination, Application No. PA 201770854, dated Jul. 31, 2018, 3 pages.
Danish Patent and Trademark Office, 4th Technical Examination, Application No. PA 201770854, dated Oct. 16, 2018, 2 pages.
Danish Patent and Trademark Office, Intention to Grant, Application No. PA 201770854, dated Sep. 24, 2018, 2 pages.
Schroeder et al. "X-band FMCW radar system with variable chirp duration" Radar Conference, 2010 IEEE, May 10, 2010, pp. 1255-1259, XP031696542.
Sun S-G et al, "Ground-based radar interferometer for tracking fast approaching targets.", IET Radar, Sonar and Naviga, vol. 5, No. 4, Apr. 1, 2011. pp. 398-404, XP006038119.
International Search Report, Application No. PCT/EP2018/079996, dated Apr. 1, 2019.

* cited by examiner

Radar image:
A radar image has 80 image lines to cover a full 360 degree image. Each image lines has 1356 range cells, and covers 4,5 degrees. Radar transmits 100 FM-CW sweeps per image line. Radar rotates with 45 rpm, one full radar image for each rotation.

RADAR BASED SYSTEM AND METHOD FOR DETECTION OF AN OBJECT AND GENERATION OF PLOTS HOLDING RADIAL VELOCITY DATA, AND SYSTEM FOR DETECTION AND CLASSIFICATION OF UNMANNED AERIAL VEHICLES, UAVS

TECHNICAL FIELD

The disclosure relates to a radar based system and method using a Frequency Modulated Continuous Wave, FMCW, radar system for scanning and detection of objects, and more particularly to generation of plots holding radial velocity data. The generated plots can be used for tracking and classification of detected objects, including objects such as Unmanned Aerial Vehicles, UAVs.

The disclosure further relates to a system for detection and classification of Unmanned Aerial Vehicles, UAVs. The classification of the UAVs may be used to make a distinction between several detected UAVs.

BACKGROUND

In recent years the number of small Unmanned Aerial Vehicles, UAVs, available to civilian users has largely increased. These platforms may be privately used for leisure and filming, but also for applications such as agriculture and environmental monitoring, surveillance, and disaster response. However, small UAVs can also be misused to perform anti-social, unsafe, and even criminal actions, such as privacy violation, collision hazard (with people, other UAVs, and larger aircraft), and even transport of illicit materials. As a result, there is an increasing interest in developing sensor systems that can detect and track UAVs. Detection and tracking of AUVs with radar poses significant challenges, as small UAVs typically have a low radar cross section and fly at lower speed and altitude in comparison with conventional aircrafts. Small UAVs are also capable of highly varied motion, which complicates the task of separating them from clutter stationary background. Also the high maneuverability of small UAVs makes the tracking problem more difficult, as it is not possible to make strong assumptions about the expected UAV motion.

FMCW radar systems are well-known and wide spread for use in the automotive sector and other industrial applications, where the FMCW radar system provides range and Doppler information of a detected object or target, where the Doppler frequency shift may be transformed into the radial velocity of the detected object or target.

During the operation of an FMCW radar, the system transmits a continuous radio energy with a frequency modulated by a triangular or sawtooth-shaped signal. As a result, the frequency of the transmitted signal varies gradually with time. When the signal is reflected by an object, the received waveform will build up a delayed replica of the transmitted waveform, with the time delay as a measure of the target range. If the target is moving, the radar system will register a Doppler shift within the received signal. Compared to the frequency of the emitted signal, the received signal will show a higher frequency when the target is approaching and a lower frequency when the target is moving away from the radar location. Thus, the total Doppler shift may result from the superposition of both source and observer motions. Specifically, the amount of Doppler shift is directly proportional to the radial speed of the target.

In range-Doppler processing, range and velocity information of moving objects is retrieved by applying a double Fourier transform to the received signal. The first transform (range FFT) is applied to the received signal from a transmitted upsweep in order to produce a high resolution range line. The range FFT is repeated for a chosen integration time to obtain an appropriate number of range lines, and the second Fourier transform (Doppler FFT) is now applied across the obtained number of range lines. The result is a so-called range-Doppler map, or range-radial velocity map, where one axis represents range and the other axis represents radial velocity. The range-Doppler map is a matrix of range-velocity cells holding return signal values of targets being hit, where the amplitude value of a range-velocity cell represents the return energy of the transmitted radar wave signal being transmitted from a target having the range and radial velocity indicated by the position of the range-velocity cell.

The range-Doppler map or matrix may be arranged with a number individual target ranges along the x-axis and a number of individual velocity ranges along the y-axis, whereby a column of the matrix represents the velocity detection span for a given individual target range, and a row represents the range detection span for a given individual target velocity range. For a given individual target range, several different target velocities with different return signal values may be observed, where the observed radial velocities and return signal values are represented by the data of the velocity column corresponding to the individual target range. The velocity column may be referred to as a so-called Doppler signature, and the range-Doppler map/matrix then consists of the Doppler signatures of all the individual target ranges. For a given target range, the data of the corresponding Doppler signature varies with time, and when successive Doppler signatures are obtained for the same target range, such as by generating a number of successive range-Doppler maps/matrixes, these Doppler signatures may be concatenated into a so-called Doppler spectrogram, showing the Doppler frequencies or radial velocities as a function of time for the individual target range being observed.

High range resolution FMCW radar systems are now also being used for detecting and characterizing small UAVs by using micro-Doppler analysis of obtained range-Doppler data. The relative motion of parts is characteristic for different classes of targets, e.g. the flapping motion of a bird's wing vs. the spinning of propeller blades. In a range-Doppler map or range-radial velocity map, the moving parts of a body causes a characteristic Doppler signature, where the main contribution comes from the torso of the body, which causes the Doppler frequency of the target, while the flapping motion of bird wings or propeller blades induces modulation on the returned radar signal and generates sidebands around the central Doppler frequency of a Doppler signature, which may be referred to as micro-Doppler signatures. The width of the sidebands of a micro-Doppler signature within a range-Doppler map/matrix may therefore be indicative of the type of target being hit by the transmitted radar waves. When using radial velocity for a range-Doppler map, the width of the sidebands of a micro-Doppler signature will then be given by the width of the radial velocity span of the micro-Doppler signature.

In order to generate a track for a target, a number of matching plots have to be generated, where a plot holds range, azimuth, amplitude and radial velocity information of a validated target. Furthermore, the FMCW radar system may have to scan for objects within a full circular range of 360° at a high repetition frequency, which requires a high number of rather complicated signal processing steps, especially for generation of the radial velocity information, to be performed within a limited time and with limited processing power.

Today's FMCW radar systems incorporates signal processors, which perform clutter filtering of the returned radar wave signals, calculate range-Doppler maps to obtain range, amplitude and radial velocity information of a validated target, which are then combined with azimuth information, from where the combined information is processed by a plot processor to obtain plots of the validated target. For FMCW radar systems scanning for objects within a full circular range of 360°, scan data may be obtained with reference to a so-called radar image, which is divided in a number image lines, which again is divided in a number of range cells, where each image line covers a given azimuth range, and with the total number of image lines covering a full circular azimuth range of from 0° to 360°.

For each image line holding a specific number of range cells and covering a specific azimuth range, a sequence of signals is transmitted within a timeframe of which the radar system covers the azimuth range of the image line, and a sequence of return signal is obtained, which return signals may be transformed into a range-Doppler map. Data from the range-Doppler map may be combined with the azimuth angle of the corresponding image line, to obtain a full data set holding range, azimuth, amplitude and radial velocity information of a validated target. A plot for a target may be generated based on a number of neighboring range cells having matching azimuth and radial velocity data, and may hold range cells within the same image line and within several neighboring image lines.

Thus, a plot may be generated based on information from several consecutively arranged image lines covering several azimuth ranges, and usually data are obtained for a group including all the image lines of a full circular azimuth range of from 0° to 360° before calculations are started for defining plots of detected targets. The quality of a plot is highly dependent on the number of return signals received by the radar system within a certain time period, and therefore depends on the number of transmitted signals within the timeframe of an image line, and also on the repetition frequency of the scanning FMCW radar system. A major limiting factor in using a high number of transmitted signals and a high scanning repetition frequency is the high requirements to signal processing speed and power.

The quality of the detection and tracking performance of the radar system highly relates to the quality of the generated plot data, and thereby to the speed at which the plot data can be generated. Thus, there is a need for improved techniques of processing received radar scan signals in order to provide high quality plot data, which can be used for tracking and classification of detected objects, including objects such as Unmanned Aerial Vehicles, UAVs. There is also a need for improved techniques for generating radar plots based on received radar scan signals, and for generating object tracks, including Unmanned Aerial Vehicle, UAV, tracks, based on radar plots obtained from received radar scan signals. There is also a need for improved techniques for classification of generated object tracks to thereby identify tracks representing real Unmanned Aerial Vehicles, UAVs.

A UAV can be a known or co-operating UAV, but a UAV can also be an unknown or non co-operating UAV, such as a hostile UAV. The flight path of a known or co-operating UAV may be controlled from a control station by exchange of telemetric data, while there is no exchange of telemetric data with an unknown or non co-operating UAV, and therefore no control of the flight path of the non co-operating UAV.

Known UAV sensor systems include radar detection systems, where the radar detection system may comprise a Doppler type radar, such as a Frequency Modulated Continuous Wave, FMCW, radar. However, such radar detection systems are not able to make a distinction between a known or unknown UAV.

Thus, there is a need for an improved sensor system, which can track UAVs and make a distinction between a known and controlled UAV and an unknown and un-controlled UAV.

SUMMARY

The aspects of the disclosed embodiments are directed to providing a system and a method, which can generate full data type radar plots holding range, azimuth, amplitude and radial velocity information of a validated target within a limited time, thereby allowing for a high scanning frequency, and a higher accuracy of tracks generated based on the plot data.

According to a first aspect there is provided a Frequency Modulated Continuous Wave, FMCW, radar system comprising: one or more antennas configured to transmit and receive FMCW radar wave signals for scanning for objects within a full circular detection coverage range; and processing circuitry configured to provide scan data based on transmitted and received FMCW radar signals and azimuth position of the antenna(s), and to generate radar plots based on obtained scan data; wherein
the processing circuitry is configured to:
provide scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s), and wherein an object, which is detected within an azimuth orientation and range to the radar antenna(s), is represented by a number of hit range cells in one or more image lines, and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object;
and wherein
the processing circuitry is further configured to:
generate first type radar plots for detected objects based on obtained scan data, where each first type radar plot is based on data from a number of neighboring hit range cells within one or more image lines of a first full circular radar image, each said first type radar plot holding range, radial velocity and return energy data for one or more detected objects;
generate second type radar plots for detected objects based on obtained scan data, where each second type radar plot is based on data from a number of neighboring hit range cells within one or more image lines of said first full circular radar image, each said second type radar plot holding azimuth, range and return energy data for one or more detected objects; and
generate full data type radar plots by combining first and second type radar plots having corresponding range data, each said full data type radar plot thereby holding azimuth, range, radial velocity and return energy data for one or more detected objects.

By dividing the process of generating data for the full data type radar plots into several steps, the use of processing power is optimized, and the final plot data can be obtained within a very short time. This allows a high scanning rate, which again improves the quality of the final plot data and a higher accuracy of tracks generated based on the plot data.

In a possible implementation form of the first aspect, the processing circuitry is configured to generate first type radar plots based on grouping of neighboring hit range cells within one or more image lines of said first full circular radar image having matching range and radial velocity data, and generate second type radar plots based on grouping of neighboring hit range cells within one or more image lines of said first full circular radar image having matching range and azimuth data.

In a possible implementation form of the first aspect, the processing circuitry is configured to initiate the generation of the first type radar plots before initiating the generation of the second type radar plots.

The generation of the radial velocity data, which may be based on generation of range-Doppler maps, is the most computational power consuming process of the computational processes required for generation of data for full data type radar plots, while generation of azimuth and range data requires less computational power. In order to obtain full data type radar plots for a full circular radar scan, scan data need to be provided and analyzed for a full circular radar image. By initiating the generation of the first type radar plots, and thereby the generation of the radial velocity data, before initiating the generation of the second type radar plots, which holds azimuth and range data, the total computational time needed to obtain plots holding data for all image lines of a circular radar image can be reduced.

In a possible implementation form of the first aspect, the processing circuitry is configured to initiate the generation of the first type radar plots upon obtaining scan data for range cells of a first image line of said first full circular radar image.

In a possible implementation form of the first aspect, the processing circuitry is configured to generate the first type radar plots by analyzing range and radial velocity data received for the hit range cells, if any, of the first image line of said first full circular radar image, and by grouping neighboring hit range cells having matching range and radial velocity data into a number of corresponding first type range radar plots, if there is any match.

In a possible implementation form of the first aspect, the processing circuitry is configured to continue generation of the first type radar plots upon obtaining scan data for range cells of a next image line of said first full circular radar image; and
continue generation of the first type radar plots until scan data has been obtained for all image line of said first full circular radar image, thereby obtaining first type radar plots for said first full circular radar image, each said first type radar plot holding range, radial velocity and return energy data for one or more detected objects.

In a possible implementation form of the first aspect, the processing circuitry is configured to continue the generation of the first type radar plot by analyzing range and radial velocity data obtained for hit range cells of the different image lines, and by grouping neighboring hit range cells having matching range and radial velocity data into a number of corresponding first type range radar plots.

In a possible implementation form of the first aspect, the processing circuitry is configured to initiate the generation of the second type radar plots when having obtained scan data for all image lines within said first full circular radar image.

In a possible implementation form of the first aspect, the processing circuitry is configured to generate the second type radar plots by analyzing range and azimuth data received for the hit range cells of image lines of a full circular radar image, and by grouping neighboring hit range cells having matching range and azimuth data into a number of corresponding second type range radar plots, thereby obtaining second type radar plots for the full circular radar image, each second type radar plot holding azimuth, range and return energy data for one or more detected objects.

In a possible implementation form of the first aspect, the processing circuitry is configured to generate the full data type radar plots for said first full circular radar image by comparing range data of the obtained first and second type radar plots of the full circular radar image, and by combining first and second type radar plots having matching range data into corresponding full data type radar plots, each said full data type radar plot thereby holding azimuth, range, radial velocity and return energy data for one or more detected objects.

In a possible implementation form of the first aspect, the processing circuitry is configured to select irregular type radar plots from full data type radar plots having velocity data representing both positive and negative radial velocities.

In a possible implementation form of the first aspect, the processing circuitry is configured to select a full data type radar plot as an irregular type radar plot when the velocity data of the full data type radar plot represents positive and negative radial velocities with at least a predetermined minimum velocity difference between the most positive radial velocity and the most negative radial velocity.

In a possible implementation form of the first aspect, the processing circuitry is configured to select a full data type radar plot as a regular type radar plot when the velocity data of the full data type radar plot represents positive radial velocities only.

In a possible implementation form of the first aspect, the processing circuitry is configured to select a full data type radar plot as a regular type radar plot when the velocity data of the full data type radar plot represents positive and negative radial velocities with at maximum velocity difference between the most positive radial velocity and the most negative radial velocity being less than said predetermined minimum velocity difference.

In a possible implementation form of the first aspect, the system is configured to provide scan data indicative of radial velocities within a predetermined positive velocity range and a predetermined negative velocity range of same size as the predetermined positive velocity range. The predetermined minimum velocity difference between the most positive radial velocity and the most negative radial velocity may be at least 50%, such as at least 60%, such as at least 70%, or such as at least 75% of the combined predetermined positive and negative velocity ranges.

In a possible implementation form of the first aspect, the system is configured to provide scan data indicative of radial velocities within the range of −30 to +30 m/s. In a possible implementation form of the first aspect, the predetermined minimum velocity difference between the most positive radial velocity and the most negative radial velocity is at least 45 m/s.

In a possible implementation form of the first aspect, the processing circuitry is configured to generate one or more unmanned aerial vehicle, UAV, tracks, where each UAV track is based on at least two irregular type radar plots having a match between corresponding data of said at least two irregular type radar plots. Here, in a possible implementation form of the first aspect, the match between corresponding data of irregular type radar plots comprises a match between radial velocity data. In a possible implementation form of the first aspect, the match between corresponding data of irregular type radar plots comprises a match between range data. In a possible implementation form of the first aspect, the match between corresponding data of irregular type radar plots comprises a match between return energy data.

In a possible implementation form of the first aspect, the processing circuitry is configured to select an irregular type radar plot as a discarded irregular type radar plot, when the irregular type radar plot does not have a match with any irregular type radar plots.

In a possible implementation form of the first aspect, the processing circuitry is configured to generate one or more bird tracks, where each bird track is based on a match between corresponding data of at least two, three or four regular type radar plots and/or second type radar plots having no match with a first type radar plot. In a possible implementation form of the first aspect, the match between corresponding data of regular type radar plots and/or second type radar plots comprises a match between range data. In a possible implementation form of the first aspect, the match between corresponding data of regular type radar plots and/or second type radar plots comprises a match between radial velocity data. In a possible implementation form of the first aspect, the match between corresponding data of regular type radar plots and/or second type radar plots comprises a match between return energy data.

In a possible implementation form of the first aspect, the processing circuitry is configured to determine if there is a match between data of a discarded irregular type radar plot and corresponding data of a generated bird track, and to include the discarded plot into said bird track if there is a match, and if there is no match, then to classify the discarded plot as representing a "hovering vehicle" track.

In a possible implementation form of the first aspect, the processing circuitry is configured to determine for the plots of a generated UAV track:
an outer energy sum being the sum of return energies for range cells representing positive and negative radial velocity signals within outer velocity ranges of the observed radial velocity range; and
a center energy sum being the sum of return energies for range cells representing radial velocity signals within a center range of the observed radial velocity range, and/or a total energy sum being the total sum of return energies of range cells representing all radial velocity signals of the observed radial velocity range.

In a possible implementation form of the first aspect, the processing circuitry is further configured to classify the UAV track as a real UAV track or non-real UAV track based at least partly on a comparison of the determined outer energy sum with the determined center energy sum or with the determined total energy sum. In a possible implementation form of the first aspect, the processing circuitry is configured to classify the UAV track as a real UAV track or non-real UAV track based at least partly on a comparison of the determined total energy sum with a predetermined maximum energy representing a predetermined maximum radar cross-section.

In a possible implementation form of the first aspect, the processing circuitry is configured to update a generated bird track with new regular type radar plots and/or second type radar plots having no match with a first type radar plot,
determine for said updated bird rack, a sum of return energies from the return energy data being hold by the radar plots representing said bird track,
determine velocity, acceleration, direction and sinuosity of movement curve from changing track data of said updated bird track, and
classify the bird track as a small bird track, a medium bird track, a large bird track, a flock of bird track, or as a non-bird track, based on the determined sum of return energies, and based on the determined velocity, acceleration, direction and sinuosity of movement curve.

In a possible implementation form of the first aspect, the processing circuitry is configured to forward, in real time, data representing the classified tracks to a display unit, said display unit being configured for displaying classified tracks based on the received track data. In a possible implementation form of the first aspect, the processing circuitry is configured to forward data representing the classified tracks to a storage unit, said storage unit being configured for storing the classified track data.

According to the first aspect, there is also provided a method of generating radar plots including radial velocity data, said method using a Frequency Modulated Continuous Wave, FMCW, radar system holding one or more antennas configured to transmit and receive FMCW radar wave signals for scanning for objects within a full circular detection coverage range, and holding processing circuitry, which is configured to obtain scan data based on transmitted and received FMCW radar signals and azimuth position of the antenna(s), and which is configured to generate radar plots based on obtained scan data; wherein the method comprises: obtaining scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s), and wherein an object, which is detected within an azimuth orientation and range to the radar antenna(s), is represented by a number of hit range cells in one or more image lines, and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object; and wherein the method further comprises:
generating first type radar plots for detected objects based on obtained scan data, where each first type radar plot is based on data from a number of neighboring hit range cells within one or more image lines of a first full circular radar image, each said first type radar plot holding range, radial velocity and return energy data for one or more detected objects;
generating second type radar plots for detected objects based on obtained scan data, where each second type radar plot is based on data from a number of neighboring hit range cells within one or more image lines of said first full circular radar image, each said second type radar plot holding azimuth, range and return energy data for one or more detected objects; and generating full data type radar plots by combining first and second type radar plots having corresponding range data, each said full data type radar plot thereby holding azimuth, range, radial velocity and return energy data for one or more detected objects.

In a possible implementation form of the method of the first aspect, the generation of the first type radar plots is based on grouping of neighboring hit range cells within one or more image lines of said first full circular radar image having matching range and radial velocity data, and the generation of the second type radar plots is based on grouping of neighboring hit range cells within one or more image lines of said first full circular radar image having matching range and azimuth data.

In a possible implementation form of the method of the first aspect, the generation of the first type radar plots is initiated before initiating the generation of the second type radar plots.

In a possible implementation form of the method of the first aspect, the generation of the first type radar plots is initiated when scan data for range cells of a first image line of a first full circular radar image is obtained.

In a possible implementation form of the method of the first aspect, the step of generating the first type radar plots comprises:
analyzing range and radial velocity data obtained for the hit range cells, if any, of the first image line, and
grouping neighboring hit range cells having matching range and radial velocity data into a number of corresponding first type range radar plots, if there is any match.

In a possible implementation form of the method of the first aspect, the step of generating the first type radar plots further comprises:
continue generation of the first type radar plots upon obtaining scan data for range cells of a next image line of said first full circular radar image; and
continue generation of the first type radar plots until scan data has been obtained for all image line of said first full circular radar image, thereby obtaining first type radar plots for a first full circular radar image, each said first type radar plot holding range, radial velocity and return energy data for one or more detected objects.

In a possible implementation form of the method of the first aspect, the continued generation of the first type radar plots is performed by analyzing range and radial velocity data obtained for hit range cells of the different image lines, and by
grouping neighboring hit range cells having matching range and radial velocity data into a number of corresponding first type range radar plots.

In a possible implementation form of the method of the first aspect, the generation of the second type radar plots is initiated when scan data for all image lines within said first full circular radar image has been obtained.

In a possible implementation form of the method of the first aspect, the generation of the second type radar plots comprises:
analyzing range and azimuth data obtained for the hit range cells of image lines of a full circular radar image, and
grouping neighboring hit range cells having matching range and azimuth data into a number of corresponding second type range radar plots, thereby obtaining second type radar plots for the full circular radar image, each second type radar plot holding azimuth, range and return energy data for one or more detected objects.

In a possible implementation form of the method of the first aspect, the generation of full data type radar plots for said first full circular radar image is performed by comparing range data of the obtained first and second type radar plots of the full circular radar image, and combining first and second type radar plots having matching range data into corresponding full data type radar plots, each said full data type radar plot thereby holding azimuth, range, velocity and return energy data for one or more detected objects.

In a possible implementation form of the method of the first aspect, the method further comprises selecting irregular type radar plots based on full data type radar plots having velocity data representing both positive and negative radial velocities.

In a possible implementation form of the method of the first aspect, a full data type radar plot is selected as an irregular type radar plot when the velocity data of the full data type radar plot represents positive and negative radial velocities with at least a predetermined minimum velocity difference between the most positive radial velocity and the most negative radial velocity.

In a possible implementation form of the method of the first aspect, the method further comprises selecting a full data type radar plot as a regular type radar plot when the velocity data of the full data type radar plot represents positive radial velocities only.

In a possible implementation form of the method of the first aspect, a full data type radar plot is selected as a regular type radar plot when the velocity data of the full data type radar plot represents positive and negative radial velocities with at maximum velocity difference between the most positive radial velocity and the most negative radial velocity being less than said predetermined minimum velocity difference.

In a possible implementation form of the method of the first aspect, the FMCW radar system is configured to provide scan data indicative of radial velocities within a predetermined positive velocity range and a predetermined negative velocity range of same size as the predetermined positive velocity range. In a possible implementation form of the method of the first aspect, the predetermined minimum velocity difference between the most positive radial velocity and the most negative radial velocity is at least 50%, such as at least 60%, such as at least 70%, or such as at least 75% of the combined predetermined positive and negative velocity ranges. In a possible implementation form of the method of the first aspect, the FMCW radar system is configured to provide scan data indicative of radial velocities within the range of −30 to +30 m/s. In a possible implementation form of the method of the first aspect, the predetermined minimum velocity difference between the most positive radial velocity and the most negative radial velocity is at least 45 m/s.

In a possible implementation form of the method of the first aspect, the method further comprises generating one or more unmanned aerial vehicle, UAV, tracks, where each UAV track is based on at least two irregular type radar plots having a match between corresponding data of said at least two irregular type radar plots. In a possible implementation form of the method of the first aspect, the match between corresponding data of two irregular type radar plots comprises a match between radial velocity data.

In a possible implementation form of the method of the first aspect, the match between corresponding data of two irregular type radar plots comprises a match between range data.

In a possible implementation form of the method of the first aspect, the match between corresponding data of two irregular type radar plots comprises a match between return energy data.

In a possible implementation form of the method of the first aspect, the method further comprises selecting an irregular type radar plot as a discarded irregular type radar plot, when the irregular type radar plot does not have a match with any irregular type radar plots.

In a possible implementation form of the method of the first aspect, the method further comprises generating one or more bird tracks, where each bird track is based on a match between corresponding data of at least two, three or four regular type radar plots and/or second type radar plots having no match with a first type radar plot. In a possible implementation form of the method of the first aspect, the match between corresponding data of regular type radar plots and/or second type radar plots comprises a match between range data. In a possible implementation form of the method of the first aspect, the match between corresponding data of regular type radar plots and/or second type radar plots comprises a match between radial velocity data. In a possible implementation form of the method of the first aspect, the match between corresponding data of regular type radar plots and/or second type radar plots comprises a match between return energy data.

In a possible implementation form of the method of the first aspect, the method further comprises determining if there is a match between data of a discarded irregular type radar plot and corresponding data of a generated bird track, and including the discarded plot into said bird track if there is a match, and if there is no match, then classifying the discarded plot as representing a "hovering vehicle" track.

In a possible implementation form of the method of the first aspect, the method further comprises to determine for the plots of a generated UAV track: an outer energy sum being the sum of return energies for range cells representing positive and negative radial velocity signals within outer velocity ranges of the observed radial velocity range; and a center energy sum being the sum of return energies for range cells representing radial velocity signals within a center range of the observed radial velocity range, and/or a total energy sum being the total sum of return energies of range cells representing all radial velocity signals of the observed radial velocity range.

In a possible implementation form of the method of the first aspect, the method further comprises classifying the UAV track as a real UAV track or non-real UAV track based at least partly on a comparison of the determined outer energy sum with the determined center energy sum and/or with the determined total energy sum. In a possible implementation form of the method of the first aspect, the classification of the UAV track as a real UAV track or non-real UAV track is further based at least partly on a comparison of the determined total energy sum with a predetermined maximum energy representing a predetermined maximum radar cross-section.

In a possible implementation form of the method of the first aspect, the method further comprises:
updating a generated bird track with new regular type radar plots and/or second type radar plots having no match with a first type radar plot,
determining for said updated bird rack, a sum of return energies from the return energy data being hold by the radar plots representing said bird track,
determining velocity, acceleration, direction and sinuosity of movement curve from changing track data of said updated bird track, and
classifying the bird track as a small bird track, a medium bird track, a large bird track, a flock of bird track, or as a non-bird track, based on the determined sum of return energies, and based on the determined velocity, acceleration, direction and sinuosity of movement curve.

In a possible implementation form of the method of the first aspect, the method further comprises forwarding in real time data for the classified tracks to a display unit, and displaying classified tracks based on the received track data on said display unit. In a possible implementation form of the method of the first aspect, the method further comprise forwarding data for the classified tracks to a storage unit, and storing the classified track data by said storage unit.

It is an object of the invention to provide a system for generating radar plots, which can be used for generating object tracks having a high probability for representing Unmanned Aerial Vehicles, UAVs. It is also an object of the invention to provide a system for generating object tracks based on the obtained radar plots.

According to a second aspect there is provided a Frequency Modulated Continuous Wave, FMCW, radar system comprising:
one or more antennas configured to transmit and receive FMCW radar wave signals for scanning for objects, such as unmanned aerial vehicles, UAVs, within a full circular detection coverage range; and
processing circuitry configured to:
provide scan data based on transmitted and received FMCW radar signals and azimuth position of the antenna(s); and
generate full data type radar plots based on obtained scan data, each said full data type radar plot holding azimuth, range, radial velocity and received return energy data for one or more detected objects; wherein
the processing circuitry is further configured to:
select irregular type radar plots from full data type radar plots, said irregular type radar plots having velocity data representing both positive and negative radial velocities within an observed radial velocity range with at least a predetermined minimum velocity difference between the observed radial velocity with the largest positive radial value and the observed radial velocity with the largest absolute negative value.

In a possible implementation form of the second aspect, the processing circuitry is configured to generate one or more object tracks or unmanned aerial vehicle, UAV, tracks, where each object/UAV track is based on at least two irregular type radar plots having a match between corresponding data of said at least two irregular type radar plots.

In a possible implementation form of the second aspect, the system is configured to provide scan data indicative of radial velocities within a predetermined positive velocity range and a predetermined negative velocity range of same size as the predetermined positive velocity range.

In a possible implementation form of the second aspect, the predetermined minimum velocity difference between the observed radial velocity with the largest positive value and the observed radial velocity with the largest absolute negative value is at least 50%, such as at least 60%, such as at least 70%, or such as at least 75% of the combined predetermined positive and negative velocity ranges.

In a possible implementation form of the second aspect, the system is configured to provide scan data indicative of relative velocities within the range of −30 to +30 m/s.

In a possible implementation form of the second aspect, the predetermined minimum velocity difference between the observed radial velocity with the largest positive value and the observed radial velocity with the largest absolute negative value is at least 45 m/s.

In a possible implementation form of the second aspect, the match between corresponding data comprises a match between radial velocity data.

In a possible implementation form of the second aspect, the match between corresponding data comprises a match between range data.

In a possible implementation form of the second aspect, the match between corresponding data comprises a match between return energy data.

In a possible implementation form of the second aspect, the processing circuitry is configured to determine for the plots of a generated object/UAV track:
an outer energy sum being the sum of return energies for range cells representing positive and negative radial velocity signals within outer velocity ranges of the observed radial velocity range; and
a center energy sum being the sum of return energies for range cells representing radial velocity signals within a center range of the observed radial velocity range, and/or
a total energy sum being the total sum of return energies of range cells representing all radial velocity signals of the observed radial velocity range.

In a possible implementation form of the second aspect, the processing circuitry is configured to classify the object/UAV track as a real UAV track or non-real UAV track based at least partly on a comparison of the determined outer energy sum with the determined center energy sum and/or with the determined total energy sum.

In a possible implementation form of the second aspect, the processing circuitry is configured to classify the object/UAV track as non-real UAV track when the determined outer energy sum is below a predetermined fraction of the determined center energy sum, such as below $1/1000$ of the center energy sum.

In a possible implementation form of the second aspect, the processing circuitry is configured to classify the object/UAV track as non-real UAV track when the determined outer energy sum is below a predetermined fraction of the determined total energy sum.

In a possible implementation form of the second aspect, the processing circuitry is configured to classify the object/UAV track as a real UAV track or non-real UAV track based at least partly on a comparison of the determined total energy sum with a predetermined maximum energy representing a predetermined maximum radar cross-section.

In a possible implementation form of the second aspect, the processing circuitry is configured to classify the object/UAV track as a non-UAV or large UAV track when the determined total energy sum is above a predetermined maximum energy representing a predetermined maximum radar cross-section, such as a maximum radar cross-section of 1 $m^2$.

In a possible implementation form of the second aspect, the processing circuitry is configured to classify the object/UAV track as a real UAV track when the determined outer energy sum is above a predetermined fraction of the determined center energy sum and/or above a predetermined fraction of the determined total energy sum, and when the determined total energy sum is below a predetermined maximum energy representing a predetermined maximum radar cross-section.

In a possible implementation form of the second aspect, the processing circuitry is configured to forward in real time data representing the classified tracks to a display unit, said display unit being configured for displaying classified tracks based on the received track data.

In a possible implementation form of the second aspect, the processing circuitry is configured to forward data representing the classified tracks to a storage unit, said storage unit being configured for storing the classified track data.

In a possible implementation form of the second aspect, the processing circuitry is configured to:
provide scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s), and wherein an object, which is detected within an azimuth orientation and range to the radar antenna(s), is represented by a number of hit range cells in one or more image lines, and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object.

In a possible implementation form of the second aspect, the processing circuitry is configured to generate full data type radar plots based on grouping of neighboring hit range cells within one or more image lines of a full circular radar image having matching range, azimuth and radial velocity data.

It should be understood that the processing system of the radar system of the second aspect may be configured for generating full data type radar plots according to one or more possible implementation forms of the first aspect. It should also be understood that the processing system of the radar system of the second aspect may be configured for generating object tracks and/or for classifying object tracks according to one or more possible implementation forms of the first aspect.

It is an object of the invention to provide a system, which can identify object tracks representing real Unmanned Aerial Vehicles, UAVs.

According to a third aspect there is provided a Frequency Modulated Continuous Wave, FMCW, radar system comprising:
one or more antennas configured to transmit and receive FMCW radar wave signals for scanning for objects, such as unmanned aerial vehicles, UAVs, within a full circular detection coverage range; and
processing circuitry configured to:
provide scan data based on transmitted and received FMCW radar signals and azimuth position of the antenna(s), said scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s), and wherein an object, which is detected within an azimuth orientation and range to the radar antenna(s), is represented by a number of hit range cells in one or more image lines, and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object; wherein
the processing circuitry is further configured to:
generate full data type radar plots based on obtained range cell scan data, each said full data type radar plot holding azimuth, range, radial velocity and received return energy data for one or more detected objects;
select irregular type radar plots from full data type radar plots, said irregular type radar plots having velocity data representing both positive and negative radial velocities within an observed radial velocity range;
generate one or more object tracks or unmanned aerial vehicle, UAV, tracks, where each object/UAV track is based on at least two irregular type radar plots having a match between corresponding data of said at least two irregular type radar plots;
determine for the plots of a generated object/UAV track:
an outer energy sum being the sum of return energies for range cells representing positive and negative radial velocity signals within a first and a second outer velocity range outside a center range of the observed radial velocity range;
a center energy sum being the sum of return energies for range cells representing radial velocity signals within the center range of the observed radial velocity range, and/or a total energy sum being the total sum of return energies of range cells representing all radial velocity signals of the observed radial velocity range; and
wherein the processing circuitry is further configured to:
classify the object/UAV track as a real UAV track or non-real UAV track based at least partly on a comparison of the determined outer energy sum with the determined center energy sum and/or with the determined total energy sum.

In a possible implementation form of the third aspect, the processing circuitry is configured to classify the object/UAV track as a real UAV track or non-real UAV track based at least partly on a comparison of the determined total energy sum with a predetermined maximum energy representing a predetermined maximum radar cross-section.

In a possible implementation form of the third aspect, the processing circuitry is configured to classify the object/UAV track as a real UAV track when the determined outer energy sum is above a predetermined fraction of the determined center energy sum and/or above a predetermined fraction of the determined total energy sum, and when the determined total energy sum is below a predetermined maximum energy representing a predetermined maximum radar cross-section.

In a possible implementation form of the third aspect, the processing circuitry is configured to classify the object/UAV track as non-real UAV track when the determined outer energy sum is below a predetermined fraction of the determined center energy sum, such as below $1/1000$ of the center energy sum.

In a possible implementation form of the third aspect, the processing circuitry is configured to classify the object/UAV track as non-real UAV track when the determined outer energy sum is below a predetermined fraction of the determined total energy sum.

In a possible implementation form of the third aspect, the processing circuitry is configured to classify the object/UAV track as a non-UAV or large UAV track when the determined total energy sum is above a predetermined maximum energy representing a predetermined maximum radar cross-section, such as a maximum radar cross-section of 1 $m^2$.

In a possible implementation form of the third aspect, the processing circuitry is configured to determine radial velocity boundaries for the center velocity range, and determine radial velocity boundaries for the first outer velocity range including negative radial velocity signals and radial velocity boundaries for the second outer velocity range including positive radial velocity signals, wherein the determination of the velocity boundaries of the first and second velocity ranges is based on the radial velocity boundaries for the center velocity range and the total observed velocity range.

In a possible implementation form of the third aspect, the processing circuitry is configured to determine radial velocity boundaries for the center velocity range based on variations in observed energy levels of returned radar signals as a function of radial velocity.

In a possible implementation form of the third aspect, the processing circuitry is configured to determine a decrease in observed energy level to a local minimum on both sides of the center velocity of the observed velocity range, and determine the radial velocity boundaries for the center velocity range as the radial velocities for which the observed energy level on both sides of the center velocity has increased by a predetermined factor from the observed local minima. It is preferred that the predetermined incremental factor is about 2 or 3 dB.

In a possible implementation form of the third aspect, the processing circuitry is configured to generate full data type radar plots based on grouping of neighboring hit range cells within one or more image lines of a full circular radar image having matching range, azimuth and radial velocity data.

In a possible implementation form of the third aspect, the processing circuitry is configured to forward in real time data representing the classified tracks to a display unit, wherein the display unit is configured for displaying classified tracks based on the received track data.

In a possible implementation form of the third aspect, the processing circuitry is configured to forward data representing the classified tracks to a storage unit, said storage unit being configured for storing the classified track data.

It should be understood that the processing system of the radar system of the third aspect may be configured for generating full data type radar plots according to one or more possible implementation forms of the first aspect. It should also be understood that the processing system of the radar system of the third aspect may be configured for generating object tracks and/or for classifying object tracks according to one or more possible implementation forms of the first aspect.

It is an object of the invention to provide a system which can both track UAVs and make a distinction between the tracked UAVs.

According to a fourth aspect there is provided an unmanned aerial vehicle, UAV, system comprising:
a control station for controlling a first co-operating unmanned aerial vehicle, UAV, the control station being configured for exchanging telemetric data with said first UAV, including data for commanding said first UAV to follow a flight path based on flight plan commands received from the control station, and said first UAV possibly being provided with a transponder holding identification information, ID, for said first UAV, and said first UAV and the control station possibly being configured for exchanging transponder data;
a radar system or ground based radar system configured to scan for objects within a detection coverage range and to provide scan data indicative of objects detected within the coverage range; and processing circuitry configured to:
generate radar plots for one or more detected objects based on scan data received from the radar system;
generate and store one or more UAV object tracks based on matching radar plots, each UAV object track holding object data corresponding to data of matching plots;
receive telemetric data and/or transponder data for said first UAV;
determine for each UAV object track whether there is a match between data of the UAV object track and corresponding telemetric data and/or transponder data for said first UAV; and
classify the UAV of a UAV object track as a first co-operating UAV when predetermined matching conditions are fulfilled for corresponding data of the UAV object track and received telemetric data and/or transponder data, and classify the UAV of a UAV object track as a second non-co-operating UAV when the predetermined matching conditions are not fulfilled.

By comparing telemetric and/transponder data with track data based on radar scan data, it is possible to divide the obtained tracks into known UAV tracks, representing a UAV which can be controlled, and into unknown UAV tracks, representing a UAV which cannot be controlled.

In a possible implementation form of the fourth aspect, the radar system comprises a Doppler type radar, such as a Frequency Modulated Continuous Wave, FMCW, radar.

In a possible implementation form of the fourth aspect, the processing circuitry is configured for generating UAV object tracks holding data representing position, radial velocity and size for a tracked object based on data of matching radar plots obtained from the received scan information. The position data may include range and azimuth relative to the radar system, the velocity data may be radial velocity/Doppler velocity, and the size data may be determined based on energy of return scan signals within plots forming the object track.

In a possible implementation form of the fourth aspect, the first co-operating UAV holds a global positioning system, GPS, and the telemetric data forwarded by the control station to the processing circuitry for said first co-operating UAV holds position data, which are based on GPS data. Such position data may include distance, azimuth, elevation, velocity, and/or direction of travel relative to the control station.

In a possible implementation form of the fourth aspect, the first co-operating UAV holds a transponder with ID data, and the transponder data forwarded by the first UAV to the control station represents ID data, and possibly also position data, such as altitude or elevation data.

In a possible implementation form of the fourth aspect, the predetermined matching conditions to be fulfilled between data of the stored tracks and received telemetric data and/or transponder data comprise a match between position data.

In a possible implementation form of the fourth aspect, the predetermined matching conditions to be fulfilled between data of the stores tracks and received telemetric data and/or transponder data comprise a match between velocity data and/or a match between size data.

In a possible implementation form of the fourth aspect, the processing circuitry is configured to determine when a match condition is fulfilled for a set of corresponding data based on a predetermined threshold difference between the data being matched.

In a possible implementation form of the fourth aspect, then when the UAV of a UAV object track is classified as a second non-co-operating UAV, the control station is configured to:
generate and forward flight plan commands to the first co-operating UAV based at least partly on object data from the object track of the second non-co-operating UAV.

In a possible implementation form of the fourth aspect, then when the UAV of a UAV object track is classified as a second non-co-operating UAV, the control circuitry is configured to:
generate and forward action commands to the first UAV based on information obtained from the object track of the second UAV, and wherein
the first co-operating UAV is configured to perform an action based at least partly on the received action commands.

In a possible implementation form of the fourth aspect, the control station is configured to generate and forward flight disturbing action commands to the first co-operating UAV based on information obtained from the object track of the second non co-operating UAV.

In a possible implementation form of the fourth aspect, the first co-operating UAV is configured to execute a flight-route or flight plan disturbing action for the second non co-operating UAV based on the received flight disturbing action commands.

In a possible implementation form of the fourth aspect, the flight-route or flight plan disturbing action to be executed may be to divert the first co-operating UAV towards the second non co-operating UAV to induce a collision between the first and second UAVs.

In a possible implementation form of the fourth aspect, the control station is configured to generate the flight plan commands and/or action commands based on position data obtained from the object track of the second non-co-operating UAV. Here, position data may include range and azimuth relative to the radar system.

In a possible implementation form of the fourth aspect, the control station is configured to generate the flight plan commands and/or action commands based on size data obtained from the object track of the second non-co-operating UAV. Here, size data may be determined based on energy of return scan signals within plots forming the object track of the second non-co-operating UAV.

In a possible implementation form of the fourth aspect, the control station is configured to generate the flight plan commands and/or action commands to the first co-operating UAV based at least partly on received telemetric data and/or transponder data for the first co-operating UAV.

In a possible implementation form of the fourth aspect, the first co-operating UAV holds a camera, and the first UAV is configured for transmitting telemetric data including a video signal to the control station, and the control station is configured for generating the flight path information based as least partly on the received video signal.

In a possible implementation form of the fourth aspect, the control station is configured to generate and forward the flight plan information based on position data obtained from the object track of the second non co-operating UAV until the second non co-operating UAV is detected within the received video signal.

In a possible implementation form of the fourth aspect, then when second non co-operating UAV is detected within the received video signal, the control station is configured to generate and forward the flight plan information based on the received video signal.

In a possible implementation form of the fourth aspect, the processing circuitry is configured to:
generate full data type radar plots based on obtained scan data, each said full data type radar plot holding azimuth, range, radial velocity and received return energy data for one or more detected objects;
select irregular type radar plots from full data type radar plots, said irregular type radar plots having velocity data representing positive and negative radial velocities within an observed radial velocity range;
generate one or more UAV object tracks, where each UAV object track is based on at least two irregular type radar plots having a match between corresponding data of said at least two irregular type radar plots.

In a possible implementation form of the fourth aspect, the selected irregular type radar plots have velocity data representing positive and negative radial velocities with at least a predetermined minimum velocity difference between the observed radial velocity with the largest positive value and the observed radial velocity with the largest absolute negative value.

In a possible implementation form of the fourth aspect, a generated UAV track is based at least partly on radar plots having matching radial velocity data.

In a possible implementation form of the fourth aspect, a generated UAV track is based at least partly on radar plots having matching range data.

In a possible implementation form of the fourth aspect, a generated UAV track is based at least partly on radar plots having matching return energy data.

In a possible implementation form of the fourth aspect, the processing circuitry is configured to match return energy data of two irregular type radar plots by:
determining a total sum of return energies representing all radial velocity signals for each of the two irregular type radar plots being matched, and
determining if there is a match between the obtained total sum of return energies.

In a possible implementation form of the fourth aspect, the processing circuitry is configured to match return energy data of two irregular type radar plots by:
determining a sum of center return energies corresponding to a centered radial velocity span within the observed radial velocity range for each of the two irregular type radar plots being matched, and
determining if there is a match between the obtained sum of center return energies.

It should be understood that the processing system of the radar system of the fourth aspect may be configured for generating full data type radar plots according to one or more possible implementation forms of the first aspect. It should also be understood that the processing system of the radar system of the fourth aspect may be configured for generating object tracks and/or for classifying object tracks according to one or more possible implementation forms of the first aspect.

It should be understood that the radar system of the first aspect may include the possible implementation forms of the radar systems of the second, third and/or fourth aspects, which implementation forms have not already been included in the first aspect. Also, the radar systems of the second aspect may include the possible implementation forms of the radar systems of the first, third and/or fourth aspects, which implementation forms have not already been included in the second aspect. Also, the radar systems of the third aspect may include the possible implementations forms of the radar systems of the first, second and/or fourth aspects, which implementation forms have not already been included in the third aspect. Similarly, the radar systems of the fourth aspect may include the possible implementations forms of the radar systems of the first, second and/or third aspects, which implementation forms have not already been included in the fourth aspect.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which.

DETAILED DESCRIPTION

Figure 1A:
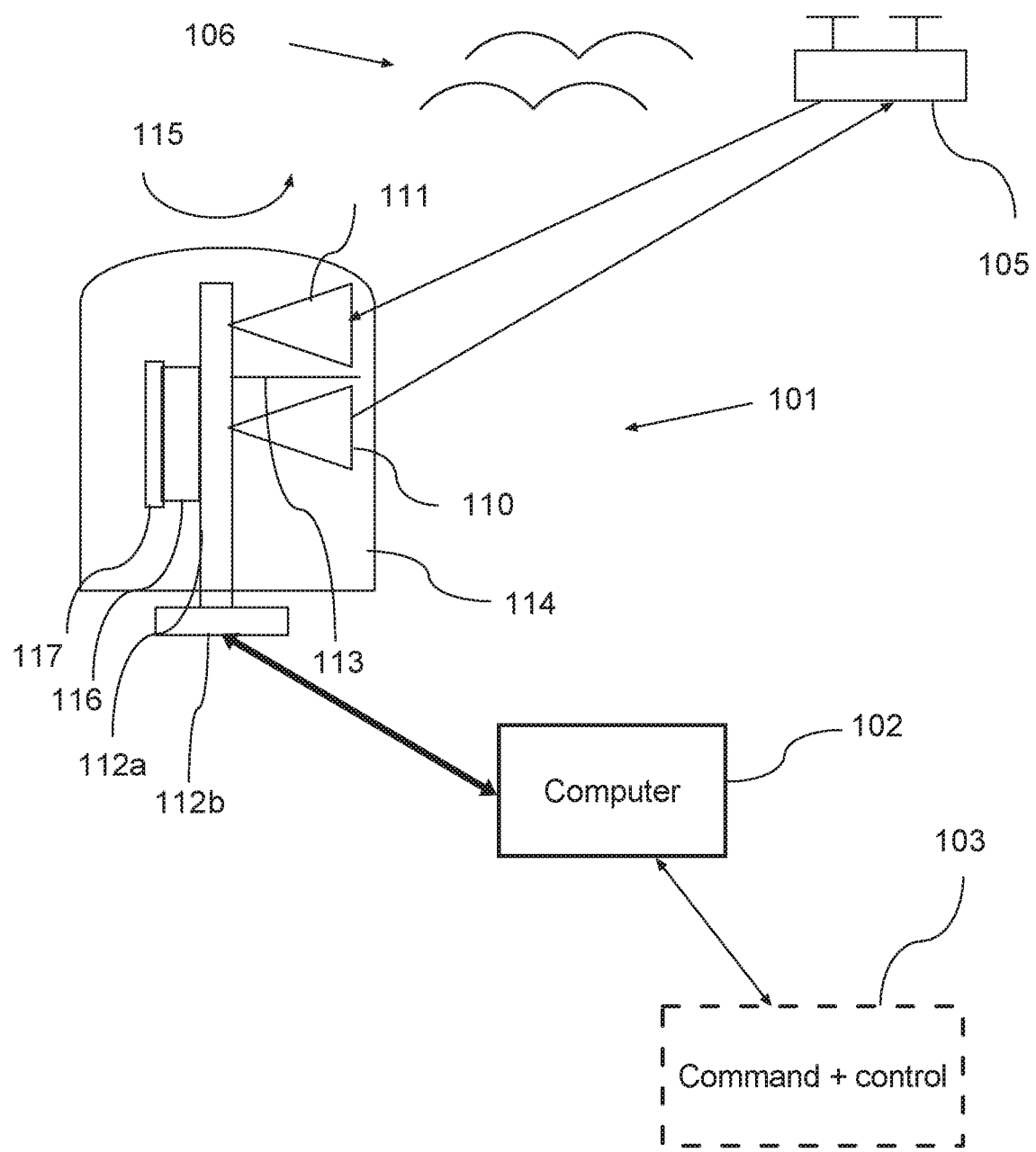
FIG. 1a is a schematic block diagram illustrating the basic structure of a scanning radar system according to an example embodiment.

FIG. 1a is a schematic block diagram illustrating the basic structure of a scanning radar system according to an example embodiment. The system comprises a Frequency Modulated Continuous Wave, FMCW, radar system 101 electronically connected to a computer system 102. Generated output data may be communicated to an external command and control system 103, where the data may be communicated by live data streaming, where for example Extensible Markup Language, XML, may be used for streaming.

The FMCW radar system 101 holds a transmitting horn antenna 110 and a receiving horn antenna 111 with a splitting plane 113 arranged between the two antennas 110 and 111 in order to prevent false reflections. The antennas 110, 111 are enclosed by a radome 114 made of a plastic type, which gives no or very low reflections of the radar waves, to thereby avoid disturbance of the Doppler frequency shift. The splitting plane 113 is arranged very close to the radome 114, again to prevent false reflections. The antennas 110, 111 are mounted to an upright support 112a, which is rotatably mounted to a horizontal support 112b, where the horizontal support is configured for rotating 115 the upright 112a with the antennas 110, 111 at a rotational speed of 45 rounds per minute, rpm. An azimuth encoder is provided at the horizontal support 112b, which encoder is configured for encoding and communicating the degree of rotation, and thereby the azimuth angle, of the antennas 110, 111, at a very high precision. The antenna system 101 is configured for transmitting FMCW radar signals in the range of 8.7 to 10 GHz at a transmission power about 4 Watt. The horn antennas 110 and 111 covers an almost square beam window having a beam height about 10° and a beam width of about 10°. Such a configuration of the antenna system 101 results in a detection coverage range of about 1 km. The beam width of 10° is much wider than normal for FMCW radar systems, where a beam width around 1° is usual. By using a wide beam width of 10° the target or object being detected will be exposed to the transmitted radar signals for a longer time, resulting in more time for data processing in order to determine the Doppler frequency shift. The targets or objects being exposed to the radar signals may include one or more Unmanned Aerial Vehicles, UAVs, 105 and one or more birds 106.

The FMCW radar system 101 holds electronic front end circuitry 116, which is also mounted to the upright 112a, for feeding the transmitting antenna 110 and for receiving radar return signals being received by the receiving antenna 111. The front end circuitry 116 is enclosed by an aluminium shield 117, which shields for electronic noise signals to enter the circuitry 116, and which also acts a heat sink. The front end circuitry 116 is electronically connected to back end circuitry being part of the azimuth encoder for communicating the azimuth angle. The front end circuitry 116 and the back end circuitry are electronically connected to the computer system 102, whereby electronic circuitry of the computer system 102, the front end circuitry 116 and the back end circuitry together provide processing circuitry for processing signals forwarded to and received from the antenna system 101 and for generating radar plots. The processing circuitry may also perform the processing for generating object tracks based on the plots and for classifying the objects of the tracks.

The electronic signals are transferred via a glass fibre cable from the front end circuitry 116 to a rotary joint at the horizontal support 112b, which is connected to the computer system 102 by cables.

Figure 1B:
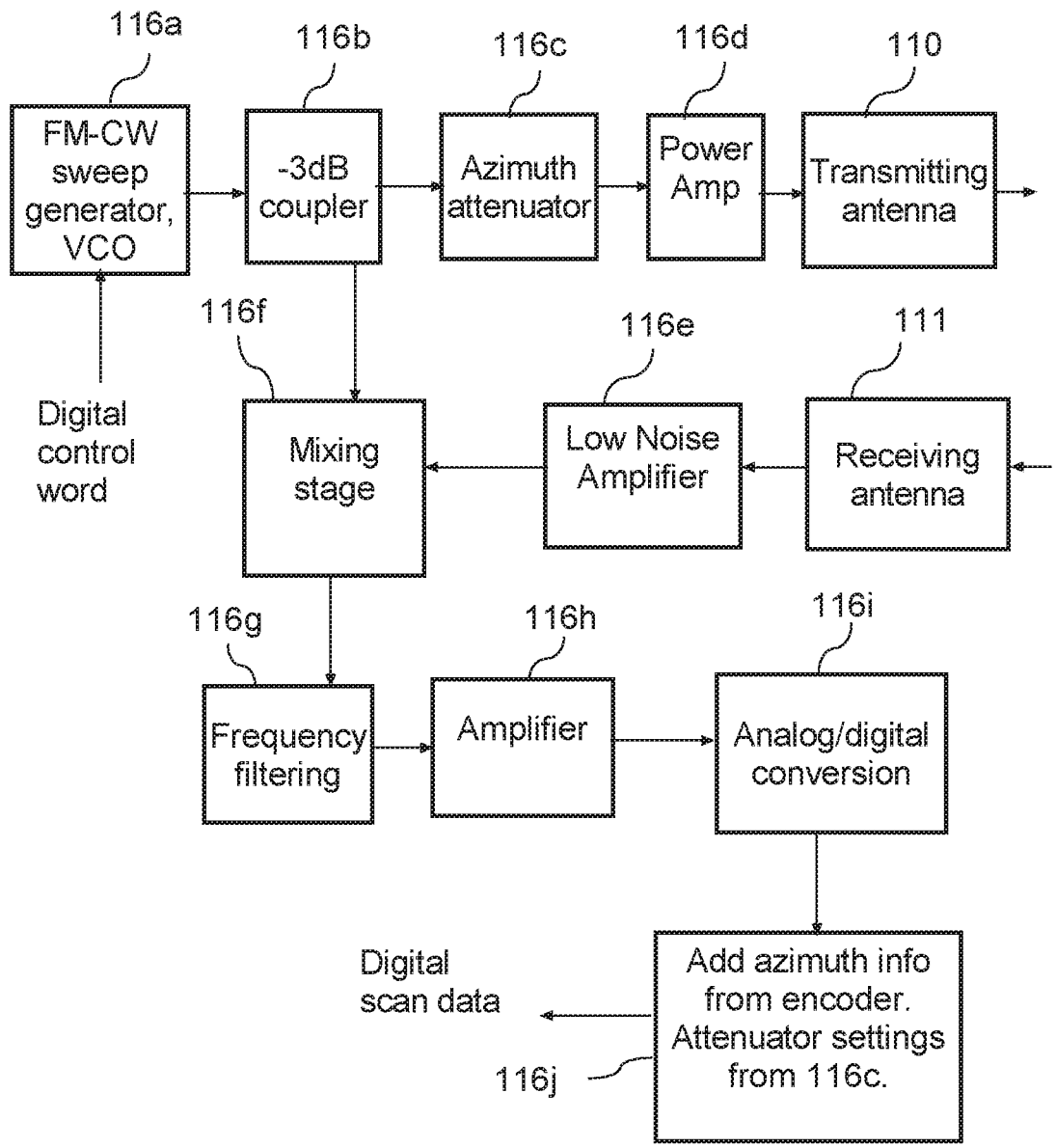
FIG. 1b is a block diagram illustrating functional components of a Frequency Modulated Continuous Waves, FMCW, transceiver being part of the radar system of FIG. 1a according to an example embodiment.

The functional components of the front end circuitry 116 and the back end circuitry is illustrated in FIG. 1b, which is a block diagram showing electronic and radar components of a Frequency Modulated Continuous Waves, FMCW, transceiver according to an example embodiment. The transmission of radar wave signals is controlled by a digital control words received by a FMCW sweep generator 116a, which holds a voltage controlled oscillator, VCO, and generates a single-sloped shaped FMCW transmission sweep signal, which is fed to a −3 dB coupler 116b. The coupler 116b branches off part of the signal to a mixing stage 116f, with the main part of the sweep signal being forwarded to a digital attenuator 116c for azimuth attenuation, with the output of the azimuth attenuator 116c being sent to a power amplifier 116d. The amplified sweep radio frequency, RF, signal is finally radiated as electromagnetic radar wave signals by the transmitting antenna 110. The returned radar wave signals are received by the receiving antenna 111, which converts the received electromagnetic waves back into a RF signal. The received RF signal is amplified by a low noise amplifier 116e, with the amplified received signal being fed into the mixing stage 116f. The output of the mixing stage 116f is the difference between the transmitted signal and the received signal. The difference signal from the mixing stage 116f is filtered by a low pass frequency filter 116g in order to block unwanted mixing frequencies, and then amplified at amplifier 116h before being converted from analog to digital signals at analog to digital converter 116i. The digital signal being output from the converter 116i is the signal output from the front end circuitry 116, and holds information from which range, radial velocity and return energy of detected objects or targets can be determined.

The azimuth information from the encoder together with attenuator settings from the attenuator 116c are then added to the output from the converter 116i by the "Add azimuth info" back end circuitry 116j, whereby digital scan data holding information from which azimuth angle, range, radial velocity and return energy of detected objects or targets can be determined. In an optional embodiment, the FMCW radar system 101 is also configured for scanning in the elevation, and for this embodiment, elevation angle information may also be added to the output from the converter 116i at the back end circuitry 116j.

The digital signal being output from the converter 116i and thereby also the digital scan data output from the back end circuitry 116, holds the information of the output difference signal from the mixing stage 116f, which difference signal holds information of the amplitude of the received return signal, the time delay, Δt, between the transmitted and received signal and the beat frequency or frequency difference, Δf, between the rising edges of the transmitted and received signals. The beat frequency also includes the Doppler frequency shift, $f_D$, and using the results of several consecutive sweep signals, the range and Doppler frequency shift or Doppler velocity can be determined by use of a double Fourier transform on the digital converted sweeps signals, and the result can be presented in a range-Doppler map.

Figure 2:
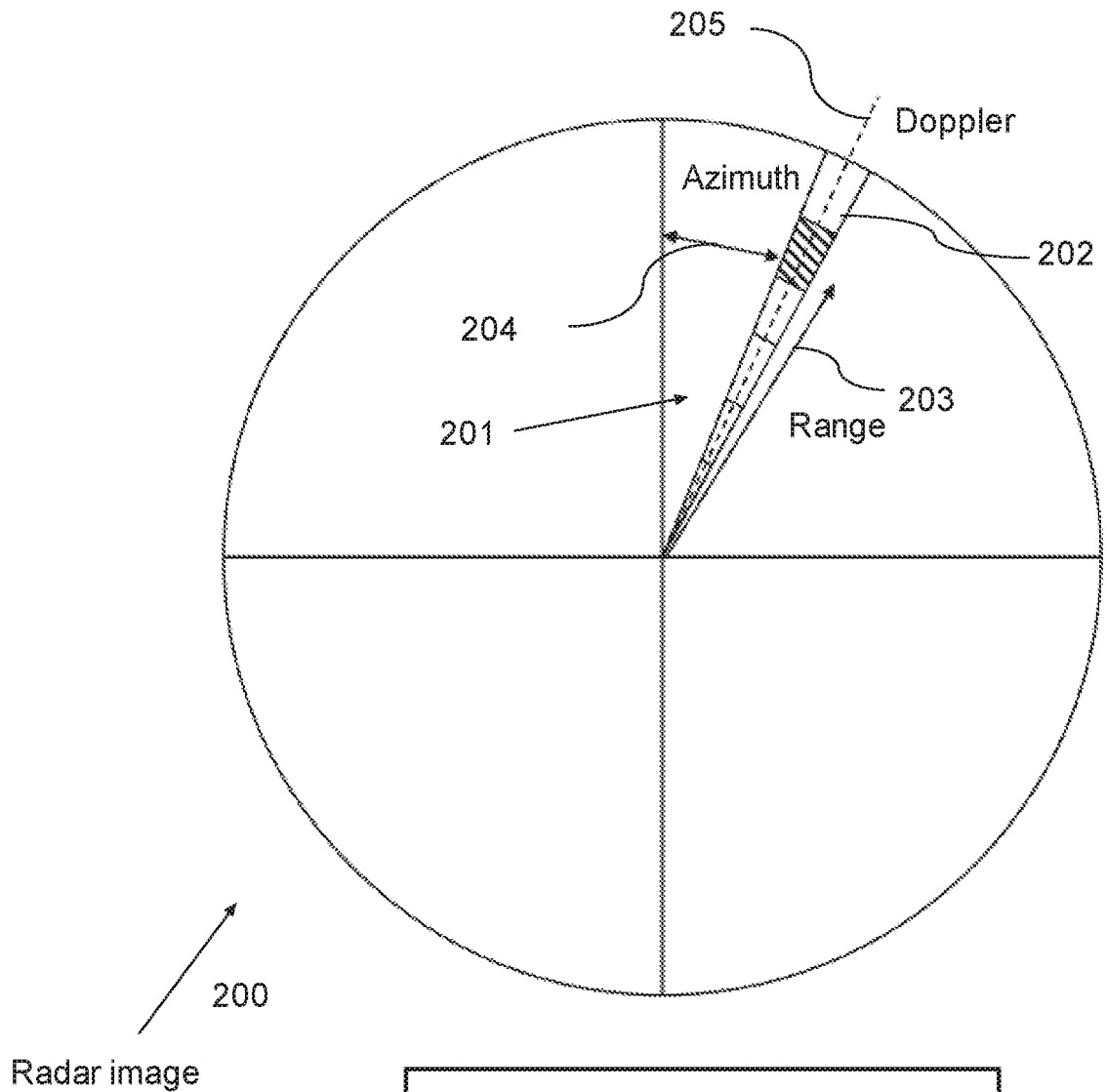
FIG. 2 illustrates a radar image with image lines and range cells according to an example embodiment.
Figure 3:
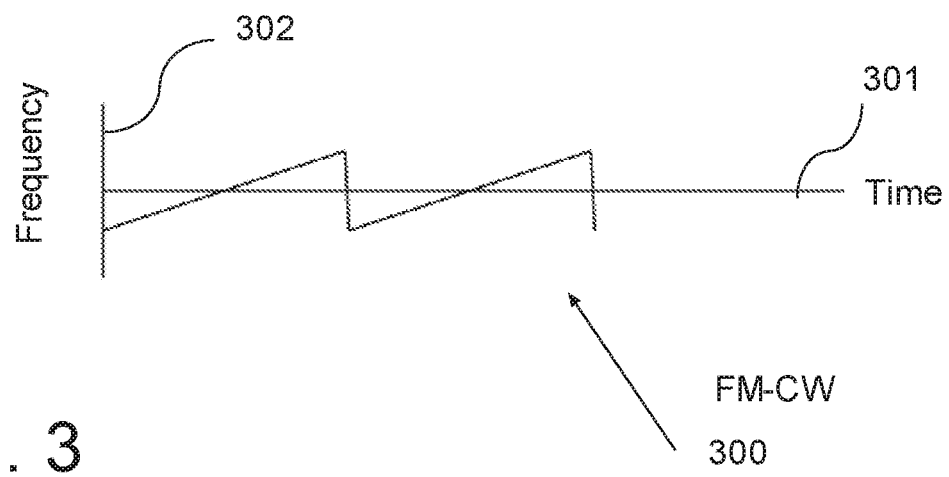
FIG. 3 illustrates transmission of radar waves in the form of Frequency Modulated Continuous Waves, FMCW, waves according to an example embodiment.

The scanning operating and presentation of data in range-Doppler maps is further illustrated in FIGS. 2, 3 and 4.

The FMCW radar system 101 scans for objects within a full circular range of 360°, and scan data is obtained with reference to a radar image as illustrated in FIG. 2. FIG. 2 shows and example embodiment of a radar image 200, which is divided in 80 image lines, 201, to cover a full azimuth range, 204, of 360° for an image. The radar 101 rotates with 45 rounds per minute, rpm, where a full radar image 200 is obtained for each rotation. Each image line is divided in 1356 range cells, 203, and covers an azimuth range of 4.5°, 202. The radar, 101, transmits 100 FMCW sweep signals, 205, per image line, which are mixed with corresponding returned radar wave signals, and from a mixed set of radar signals, where each set represents a full 100 FMCW sweep signals, a Doppler map representing the corresponding image line, 201, having a certain azimuth range, is generated.

The antennas 110, 111 of the radar system 101 has a beam width of about 10°, which is about the double of the azimuth range for an image line 201. This allows the transmission and receipt of the 100 FMCW sweep signals within the time frame of which an image line 201 is covered by the antennas 110, 111 during the rotation of the radar system 101.

The FMCW sweep signals may have a single-sloped shape, as illustrated in FIG. 3, which shows a couple of FMCW radar waves 300 in a time-frequency diagram, 301, 302, according to an example embodiment.

Figure 4A:
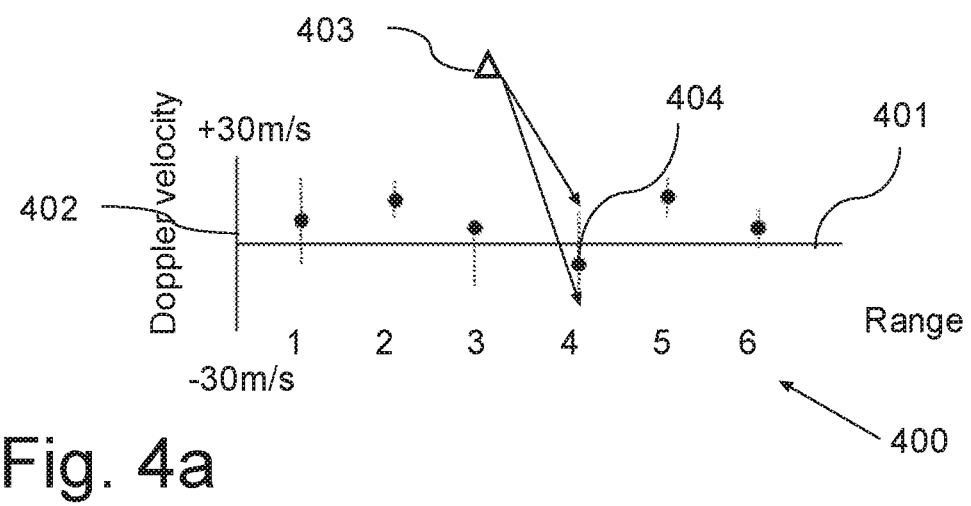
FIGS. 4a and 4b illustrates a range-Doppler map with micro-Doppler signatures according to an example embodiment.

FIG. 4a illustrates a range-Doppler map 400 with micro-Doppler signatures according to an example embodiment, where range is along the x-axis, 401, and radial velocity/Doppler velocity is along the y-axis, 402, with maximum radial velocities of +30 m/s and −30 m/s. The range-Doppler map 400 of FIG. 4a shows an example of the spread in radial velocities for 6 range cells. For range cell 4 there is a spread in the observed radial velocity indicated by A, 403, where the full dot, 404, indicates the radial velocity, for which the received return signal has the highest amplitude or return energy, while the smaller dots on each side of the full dot, 404, represents radial velocities with smaller amplitude or return energy in the received return signal. For range cell 4, the main contribution in radial velocity indicated by the dot 404 may come from the torso of a target, such as a bird or helicopter, and represent the radial/Doppler velocity of the target, while the observed velocity-sidebands around the dot, 404, are referred to as micro-Doppler signatures and may represent flapping motion of bird wings or propeller blades of a helicopter.

Figure 4B:
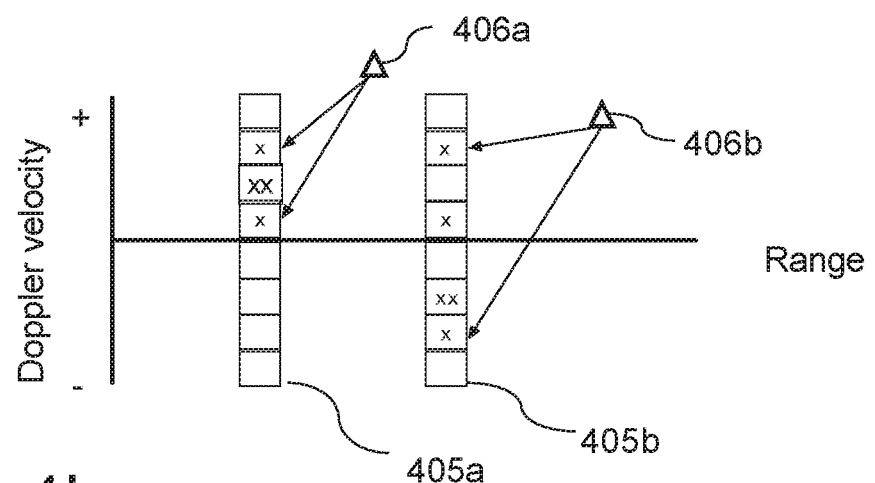

The range-Doppler map may be calculated as a range-Doppler matrix, where a column of the matrix represents the velocity detection span for a given individual target range or range cell, and a row represents the range detection span for a given individual target velocity range. The velocity column may be referred to as a so-called Doppler signature, and the range-Doppler map/matrix then consists of the Doppler signatures of all the individual target ranges or range cells. Each cell, which is referred to as a bin, within the range-Doppler matrix then represents a certain range cell, and a certain radial velocity range. This is illustrated in FIG. 4b, which shows two Doppler signatures, 405a and 405b, for two different target ranges or range cells. The amount of received return energy is indicated by one or more "x" for each bin of the Doppler signatures, 405a and 405b. Both Doppler signatures, 405a and 405b, have velocity sidebands or micro-Doppler signatures on both sides of a main Doppler velocity, where the bins with "xx" may represent the torso of a target, while the bins with one "x" may represent flapping or rotating motions of a target.

The Doppler signature 405a holds three neighboring bins with observed radial velocities given a radial velocity spread A, 406a. It is noted that all the observed velocities within the spread 406a are positive, indicating that all target parts giving a return signal are moving away from the radar system 101 at the time of observation. The Doppler signature 405b holds four bins with observed radial velocities given a radial velocity spread A, 406b. It is noted that the observed velocities within the spread 406b are both positive and negative, with the highest return energy being observed for a bin with negative radial velocity, indicating that the torso of the target is moving in the direction of the radar system 101, while other parts of the target are moving in both radial directions of the radar system 101 at the time of observation. The Doppler signatures 405a, 405b of FIG. 4b each holds 8 bins, but for the radar system 101, which is configured for 100 FMCW sweep signals, 205, per image line, 201, then the obtained Doppler signatures has 100 bins, with 50 bins for positive radial velocities and 50 bins for negative radial velocities. With 1356 range cells, 203, within each image line, 201, then for each image line, 201, a range-Doppler map/matrix holding 100 rows and 1356 columns is generated for each image line, 201. For 80 image lines, 201, then 80 range-Doppler maps/matrices have to be generated to cover a full radar image, 200, where each range-Doppler map/matrix corresponds to an image line within a defined 4.5° azimuth range. It is noted that each bin, for which there is a hit-target, holds information of the amplitude or return energy of the received radar signal, and the position of the bin within the range-Doppler map/matrix gives the radial velocity of the target and the distance to the target, while the azimuth angle is given by the position of the image line, 201, within the radar image, 200.

An important feature of the present disclosure is to divide the process of generating data for the full data type radar plots into several steps, to thereby optimize the use of processing power. This is illustrated in the FIGS. 5, 6 and 7.

Figure 5:
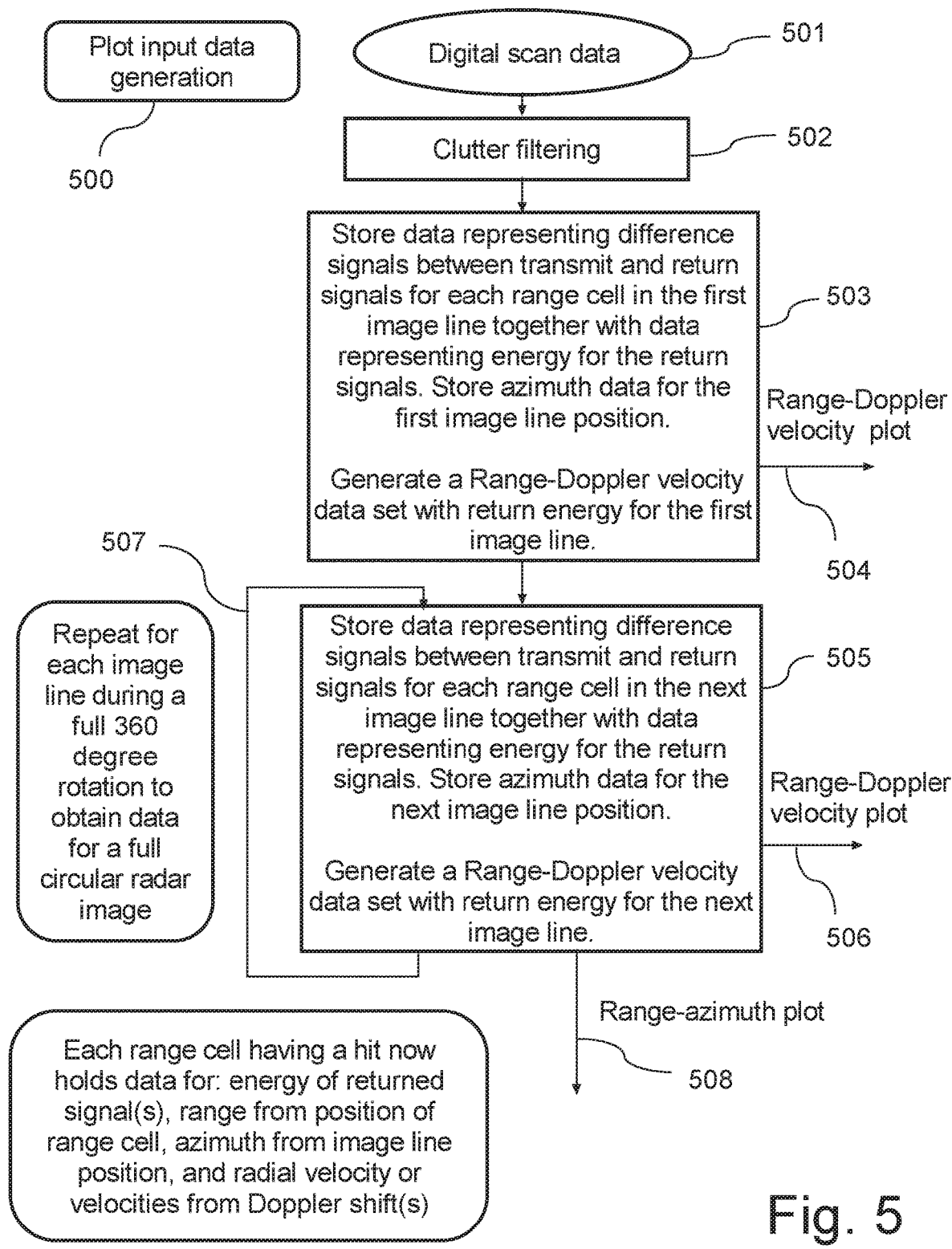
FIG. 5 is a flow diagram illustrating generation of data to be used for plot generation according to an example embodiment.

FIG. 5 is a flow diagram illustrating generation of data to be used for plot generation according to an example embodiment. The whole process of FIG. 5 is named "plot input data generation", 500, and starts by the digital scan data, 501, being output from front and back end circuitry 116 of FIG. 1b. The digital scan data then goes through a clutter filtering process, 502, to separate target data from clutter data, which may be a digital filtering process based on Doppler content and amplitude content of the obtained data. Different processes of clutter filtering are known in the art of radar scanning.

The received and filtered data are then stored, where the first set of data to be stored is the scan data for the first image line being scanned, which data represents difference signals between transmit and return signals for each range cell in the first image line, energy for the return signals, and azimuth angle for the first image line position. A double Fourier transform is used on the stored data to thereby generate and store a range-Doppler velocity data set or map with return energies for the first image line, step 503. The obtained range-Doppler velocity data set or map for the first image line can now be used for initiating the generation of range-Doppler velocity plots, 504, see FIG. 6.

The procedure of step 503 is repeated in step 505 for the next image line, where scan data for the next image line being scanned is stored, which data represents difference signals between transmit and return signals for each range cell in the next image line, energy for the return signals, and azimuth angle for the next image line position. A double Fourier transform is used on the stored data to thereby generate and store a range-Doppler velocity data set or map with return energies for the next image line, and the obtained range-Doppler data set or map for the next image line can now be used for further generation of the range-Doppler velocity plots, 506.

The procedure of step 505 is repeated for each image line during a full 360 degree scan rotation to obtain data for the full circular radar image, step 507. Each range cell of the full radar image having a hit now holds data for: energy of returned signal(s), range from position of range cell, azimuth from image line position, and radial velocity or velocities from Doppler shift(s) and mapped in the range-Doppler maps. Range, azimuth, and return energy data for all image lines of the full radar image is now used for generation of range-azimuth plots, 508, see FIG. 7.

Figure 6:
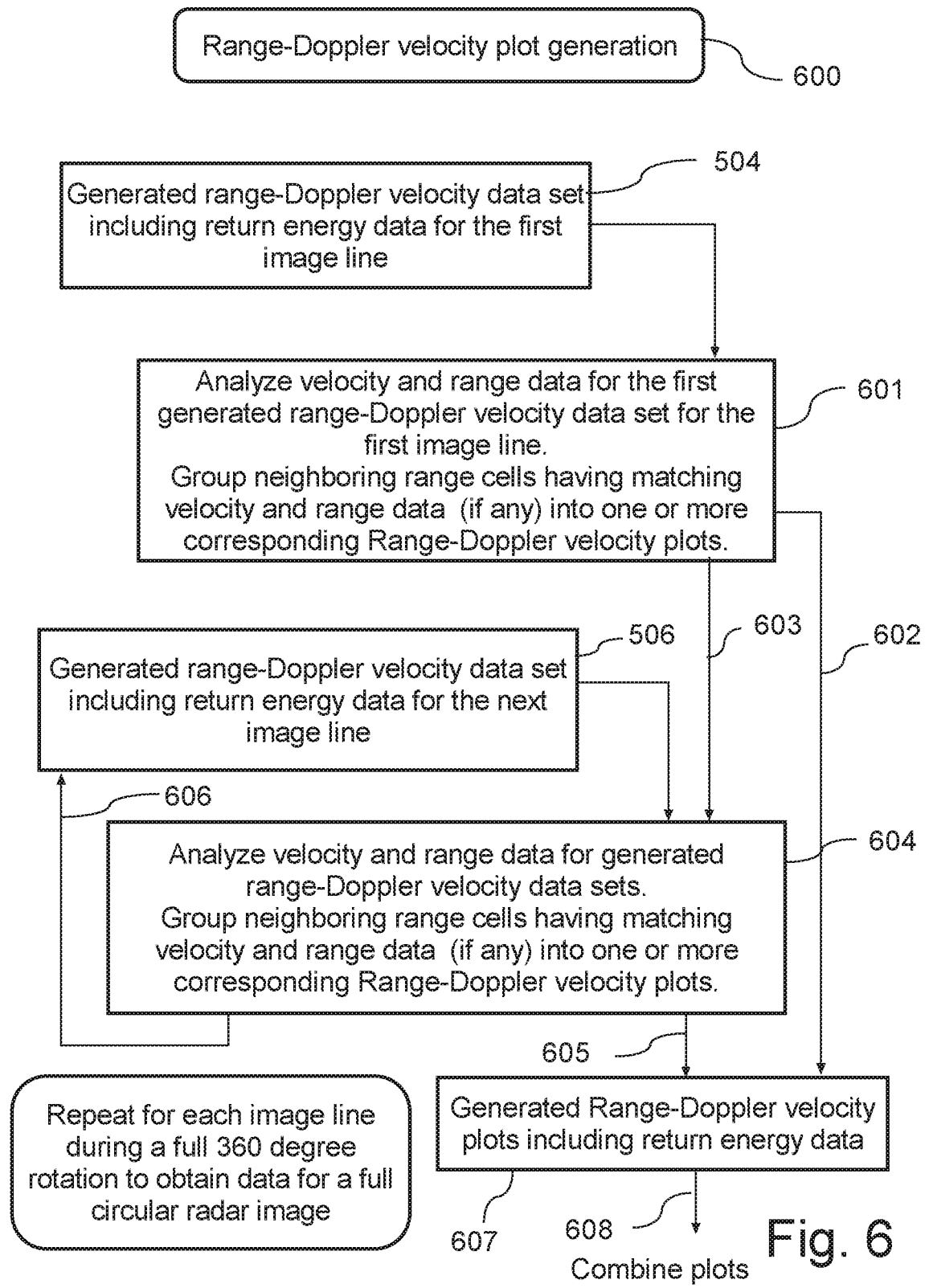
FIG. 6 is a flow diagram illustrating generation of first type radar plots holding range, radial velocity and return energy information according to an example embodiment.

FIG. 6 is a flow diagram illustrating generation of first type radar plots or range-Doppler velocity plots holding range, radial velocity and return energy information according to an example embodiment. The whole process of FIG. 6 is named "range-Doppler velocity plot generation", 600, and starts by the generated range-Doppler velocity data set including return energy data for the first image line being output at step 504 from the "plot input data generation", 500.

The generation of the first type radar plots or range-Doppler velocity plots is initiated at step 601, in which velocity and range data for the first generated range-Doppler velocity data set for the first image line is analysed. Based on this analysis, neighboring range cells having matching velocity and range data (if any) are grouped into one or more corresponding range-Doppler velocity plots. Examples of matching conditions are known in the art of radar scanning and plot generation, but a match condition may be fulfilled for a set of corresponding data, when the difference between the data being matched is below a predetermined threshold difference. Thus, there may be a maximum threshold difference in range for defining neighboring range cells being matched, and there may be a maximum threshold difference in radial velocities of these neighboring range cells before the cells are matched in a plot. The generated range-Doppler velocity plots including return energy data are stored, steps 602 and 607.

The generation of the first type radar plots or range-Doppler velocity plots proceeds at step 604, and is based on the generated range-Doppler velocity data set including return energy data for the next image line being output at step 506 from the "plot input data generation", 500, while also being based on the previously generated range-Doppler velocity data set including return energy data for the first image line being, step 603. The procedure in step 604 is similar to the procedure of step 601, and velocity and range data for the generated range-Doppler velocity data sets for the first and next image lines are analysed, and neighboring range cells having matching velocity and range data are grouped into one or more corresponding range-Doppler velocity plots. The generated range-Doppler velocity plots including return energy data are stored, steps 605 and 607. In order to form a plot, there need to be at least two neighboring range cells having matching data, but it is preferred that in order to form at plot, there needs to be at least four, five or six neighboring range cells having matching data.

The procedure of step 604 is repeated, step 606, for data sets obtained for the following image lines, until data sets for each image line of a full circular radar image have been analysed. Thus, velocity and range data for the generated range-Doppler velocity data sets for a new image line are analysed together with the already received data sets for the previous image lines, and neighboring range cells having matching velocity and range data are grouped into one or more corresponding range-Doppler velocity plots. The generated range-Doppler velocity plots including return energy data are stored, steps 605 and 607. The range-Doppler velocity plots stored at step 607 may be used as inputs when combining plots into full data type plots, step 608. See FIG. 9 for combination of plots.

Figure 7:
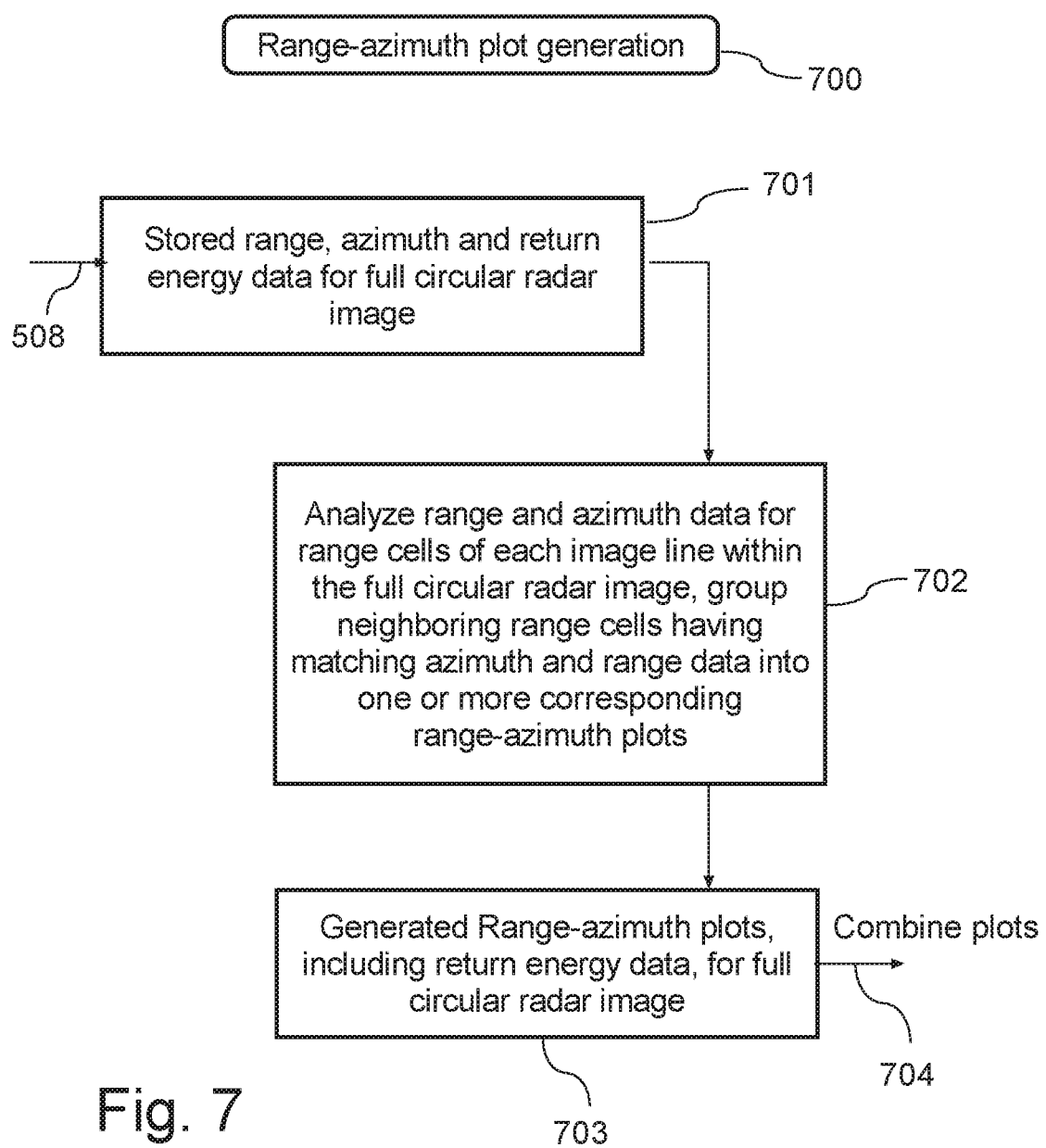
FIG. 7 is a flow diagram illustrating generation of second type radar plots holding range, azimuth and return energy information according to an example embodiment.

FIG. 7 is a flow diagram illustrating generation of second type radar plots or range-azimuth plots holding range, azimuth and return energy information according to an example embodiment. the whole process of FIG. 7 is named "range-azimuth plot generation", 700, and starts at step 701 by the generated range, azimuth and return energy data set for the full circular radar image being output at step 508 from the "plot input data generation", 500.

The generation of the second type radar plots or range-azimuth plots for a full radar image is performed at step 702, in which range and azimuth data for range cells of each image line within the full circular radar image are analysed. Based on this analysis, neighboring range cells having matching azimuth and range data are grouped into one or more corresponding range-azimuth plots. Also here, a match condition may be fulfilled for a set of corresponding data, when the difference between the data being matched is below a predetermined threshold difference. Thus, there may be a maximum threshold difference in range for defining neighboring range cells being matched, and there may be a maximum threshold difference in azimuth range of these neighboring range cells before the cells are matched in a plot. The generated range-azimuth plots including return energy data for the full circular radar image are stored, step 703. The range-azimuth plots stored at step 703 may be used as inputs when combining plots into full data type plots, step 704. See FIG. 9 for combination of plots. Also here, there need to be at least two neighboring range cells having matching data, while it is preferred that in order to form at plot, there needs to be at least four, five or six neighboring range cells having matching data.

Figure 8:
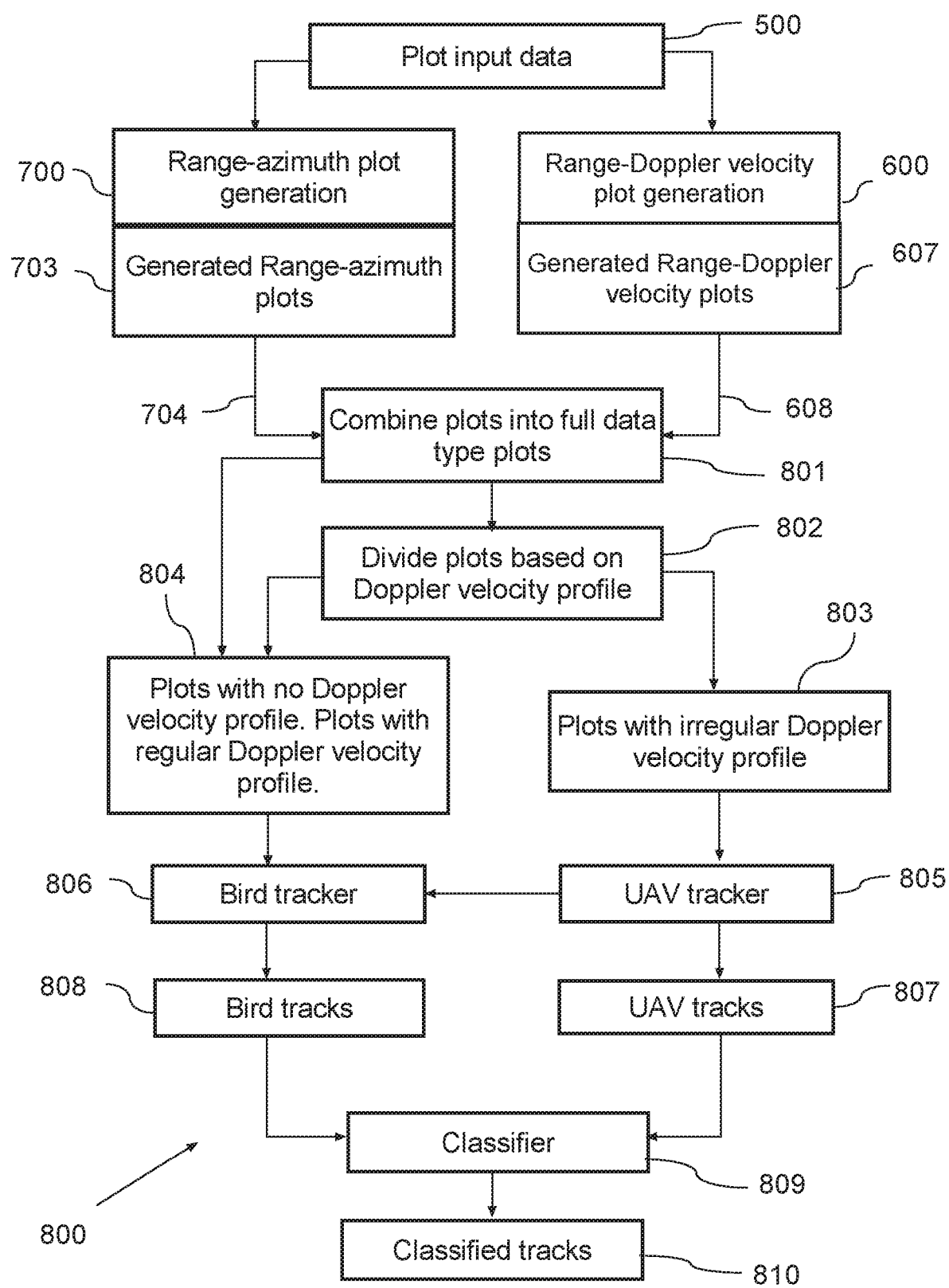
FIG. 8 is an overview flow diagram illustrating processing steps performed for reaching a classification of a detected object according to an example embodiment.

FIG. 8 is an overview flow diagram illustrating processing steps performed for reaching a classification for a detected object according to an example embodiment. The process map of FIG. 8 starts with plot input data being generated at process 500. Based on the plot input data, range-Doppler velocity plots are generated, process 600, and stored, step 607 of process 600. Also range-azimuth plots are generated, process 700, and stored, step 703 of process 700.

For a full circular radar scan, the range-Doppler velocity plots of process 700 are generated during the scan, starting when scan data are obtained for the first image line, while the range-azimuth plots are first generated when a full scan has been performed. When the first set of range-azimuth plots have been generated for the first circular radar scan, and thereby for the first full radar image, the process proceeds by comparing and combining the obtained range-Doppler velocity plots, 608, and range-azimuth plots, 704, into full data type plots, step 801, which is further described in connection with FIG. 9. It is noted that during the following circular radar scan, new range-Doppler plots are generated and stored during the scan, while new range-azimuth plots are first generated and stored when the following circular radar scan is completed. This procedure of plot generation is repeated for each full circular radar scan.

When comparing the obtained range-Doppler velocity plots and range-azimuth plots at step 801, the range-azimuth plots, which cannot be matched with a range-Doppler velocity plot, is forwarded to a so called "Bird tracker" 806 via step 804. The range-Doppler velocity plots, which cannot be matched with a range-azimuth plot is discarded.

In step 801, the remaining plots are combined into full data type plots, which now hold range, azimuth, radial velocity, and return energy data for detected objects forming part of a plot. The next step is to divide the full data type plots based on Doppler velocity profile, step 802, which is further described in connection with FIG. 10. The combined plots are divided into plots with irregular Doppler velocity profile, step 803, and plots with regular Doppler velocity profile, step 804. The plots with irregular Doppler velocity profile are fed to a so called "Unmanned Aerial Vehicle, UAV, tracker", step 805, for generating so-called "UAV tracks", step 807, which is further described in connection with FIGS. 11 and 14. The plots with regular Doppler velocity profile may be fed to a so called "Bird tracker", step 806, for generating so-called "Bird tracks", step 807, which is further described in connection with FIGS. 12 and 13. Plots with irregular Doppler velocity, which does not fit into any UAV tracks 807 may be send to the bird tracker 806 to see, if the plots fits into any bird tracks 808. The obtained UAV tracks 807 and bird tracks 808 may go through a classification process, step 809, resulting in classified tracks, step 810. An example of a classification process is further described in connection with FIG. 15.

Figure 9:
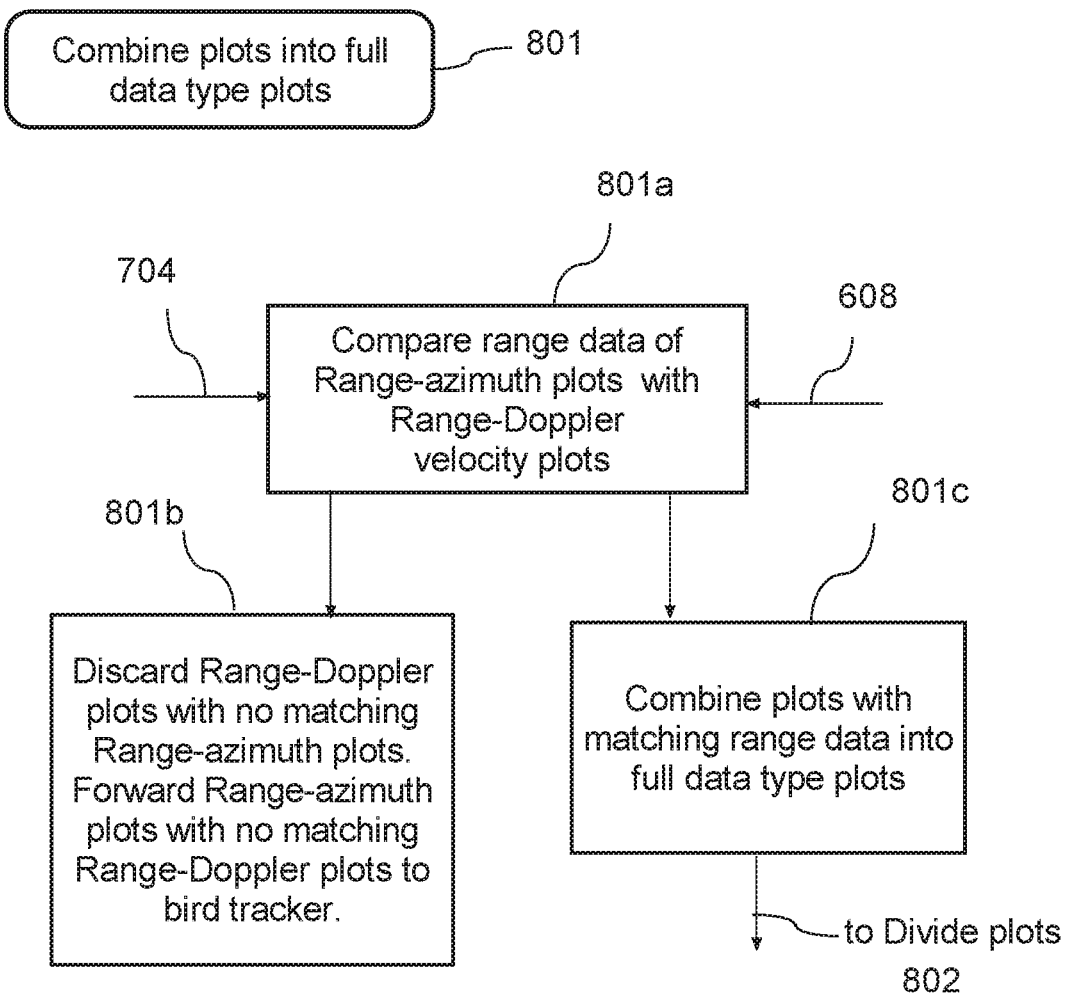
FIG. 9 is a flow diagram illustrating generation of full type radar plots holding range, azimuth radial velocity and return energy information according to an example embodiment.

FIG. 9 is a flow diagram illustrating generation of full type radar plots holding range, azimuth radial velocity and return energy information according to an example embodiment. The diagram of FIG. 9 corresponds to step 801 of FIG. 8, in which plots are combined into full data type plots. The received range-Doppler velocity plots, 608, and range-azimuth plots, 704, all hold range data, and in step 801*a*, the range data of range-azimuth plots is compared with the range data of range-Doppler velocity plots. The plots having matching range data, where there may be a maximum threshold difference in range for defining matching plots, are combined into full data type plots, step 801*c*, while in step 801*b* the azimuth-range plots having no range match with a range-Doppler velocity plot are forwarded to the bird tracker and range-Doppler velocity plots having no range match with a range-azimuth plot are discarded. Each combined plot now holds the following data from a number of hit range cells: energy of return signal(s), range, azimuth, and radial velocity/velocities. Also for the combined plots, it is preferred that in order to form at plot, there needs to be at least four, five or six neighboring range cells having matching data.

Figure 10:
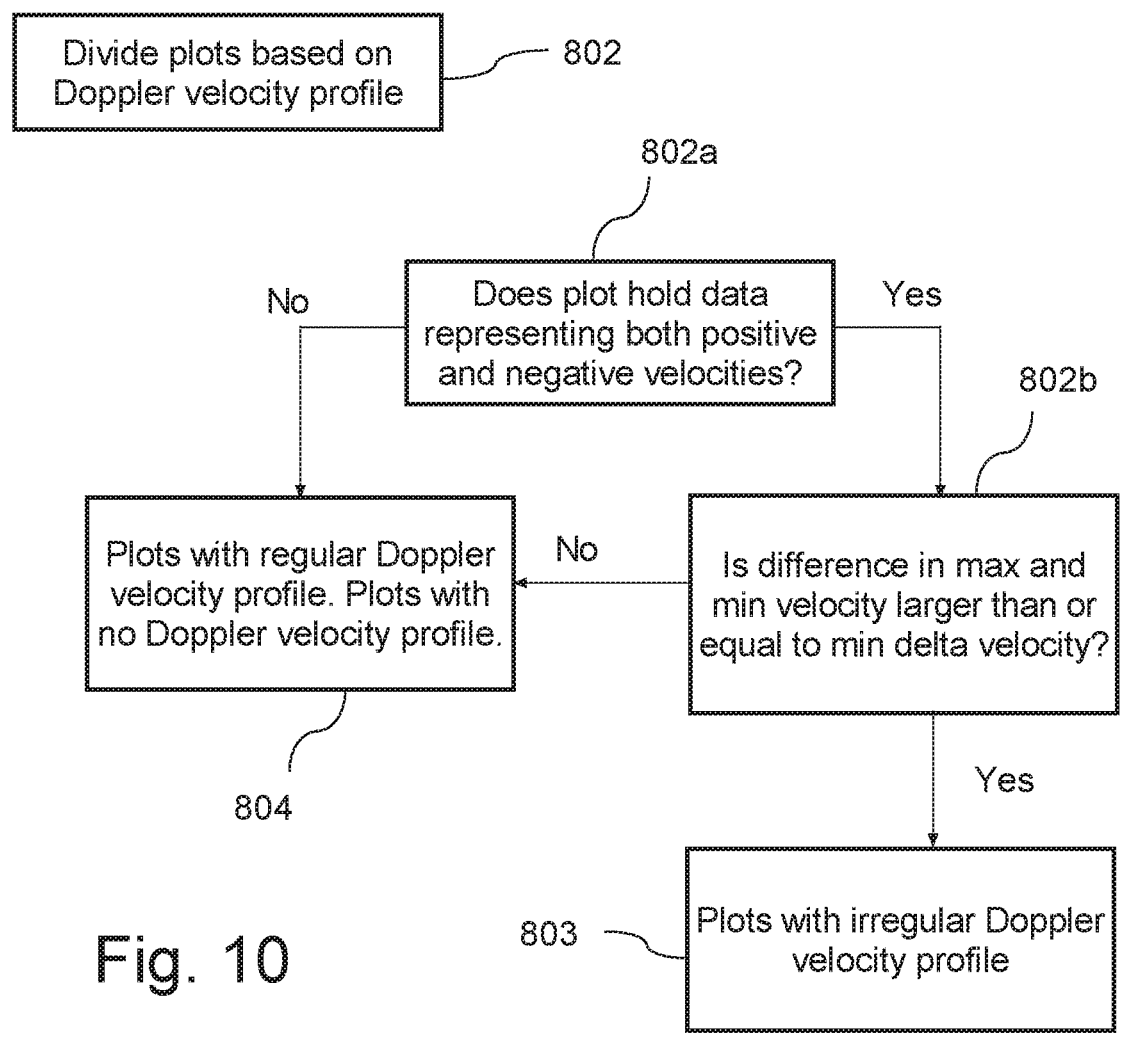
FIG. 10 is a flow diagram illustrating division of obtained full type radar plots into regular and irregular plots based on velocity information according to an example embodiment.

The resulting combined plots of step 801*c* may then be divided based on Doppler velocity profiles, step 802, as described in connection with FIG. 10, which is a flow diagram illustrating division of obtained full type radar plots into regular and irregular plots based on velocity information. As illustrated and described in connection with FIGS. 4*a* and 4*b*, then for each range cell, the range-Doppler matrix holds a Doppler signature with a number of bins covering the radial velocity span being covered by the scanning radar system 101. A combined plot may represent data from one or more neighboring range cells, having one or more corresponding neighboring Doppler signatures, and the Doppler signatures may represent radial velocities within a radial velocity span, which may include both positive and negative radial velocities.

Thus, the first step in dividing the combined plots is to analyse the radial or Doppler velocity data of the plots. This is done in step 802*a*, and if a plot holds data representing only positive or only negative velocities, the plot is stored as a plot with regular Doppler velocity profile, step 804. If the plot holds data representing both positive and negative velocities, then it is determined if the difference in maximum and minimum velocities, i.e. the difference between the most positive radial velocity and the most negative radial velocity, is larger than or equal to a predetermined minimum velocity difference of delta velocity. If the difference in maximum and minimum radial velocities is below the predetermined minimum velocity difference, then the plot is stored as a plot with regular Doppler velocity profile, step 804, while if the difference in maximum and minimum radial velocities is equal to or above the predetermined minimum velocity difference, then the plot is stored as a plot with irregular Doppler velocity profile, step 803.

The predetermined minimum velocity difference between the most positive radial velocity and the most negative radial velocity may be selected to be at least 50%, such as at least 60%, such as at least 70%, or such as at least 75% of the total radial velocity span being covered by the scanning radar system 101. In an embodiment, the FMCW radar system 101 is configured to provide scan data indicative of radial velocities within the range of minus 30 m/s to plus 30 m/s, and here the predetermined minimum velocity difference between the most positive radial velocity and the most negative radial velocity may be set to be at least 45 m/s.

Figure 11:
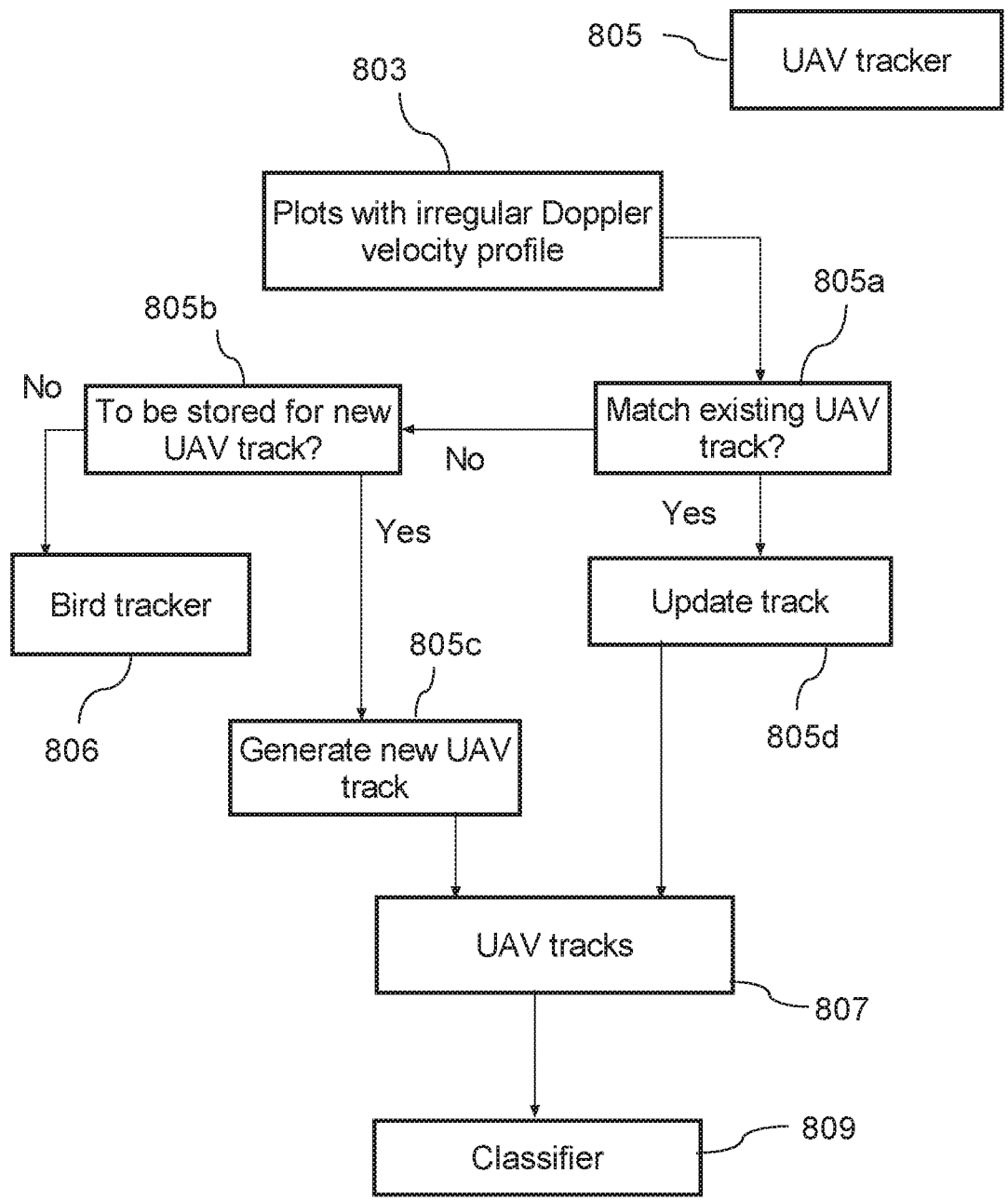
FIG. 11 is an overview flow diagram illustrating generation of Unmanned Aerial Vehicle, UAV, tracks according to an example embodiment.

FIG. 11 is an overview flow diagram illustrating generation of Unmanned Aerial Vehicle, UAV, tracks according to an example embodiment. The diagram of FIG. 11 corresponds to the UAV tracker, step 805, of FIG. 8. The tracking process 805 is based on the plots with irregular Doppler velocity profile found in step 803. The first step is to analyse if a plot matches any existing UAV tracks, step 805*a*. If no tracks has been generated yet, or if there is no match, the plot is stored and may be used for generating a new UAV track, step 805*b*. If the plot gets too old without having a match with other plots to form a track, the stored plot may be discarded and may be fed into the bird tracker, step 806. If there are several stored plots having a match, such as at least two or three, but preferably at least four, five or six matching plots, a new UAV track may be generated, step 805*c*, and stored as a UAV track, step 807. The stored UAV tracks are used in step 805*a* when matching a new plot with an existing UAV track, and if there is a match, the matching UAV track is updated with the data of the new plot, step 805*d*. The generated and stored UAV tracks, 807, may then be classified, step 809, as further described in connection with FIG. 15. In order to form a plot, there need to be at least two neighboring range cells having matching data, but it is preferred that in order to form at plot, there needs to be at least 4, 5 or 6 neighboring range cells having matching data.

Figure 12:
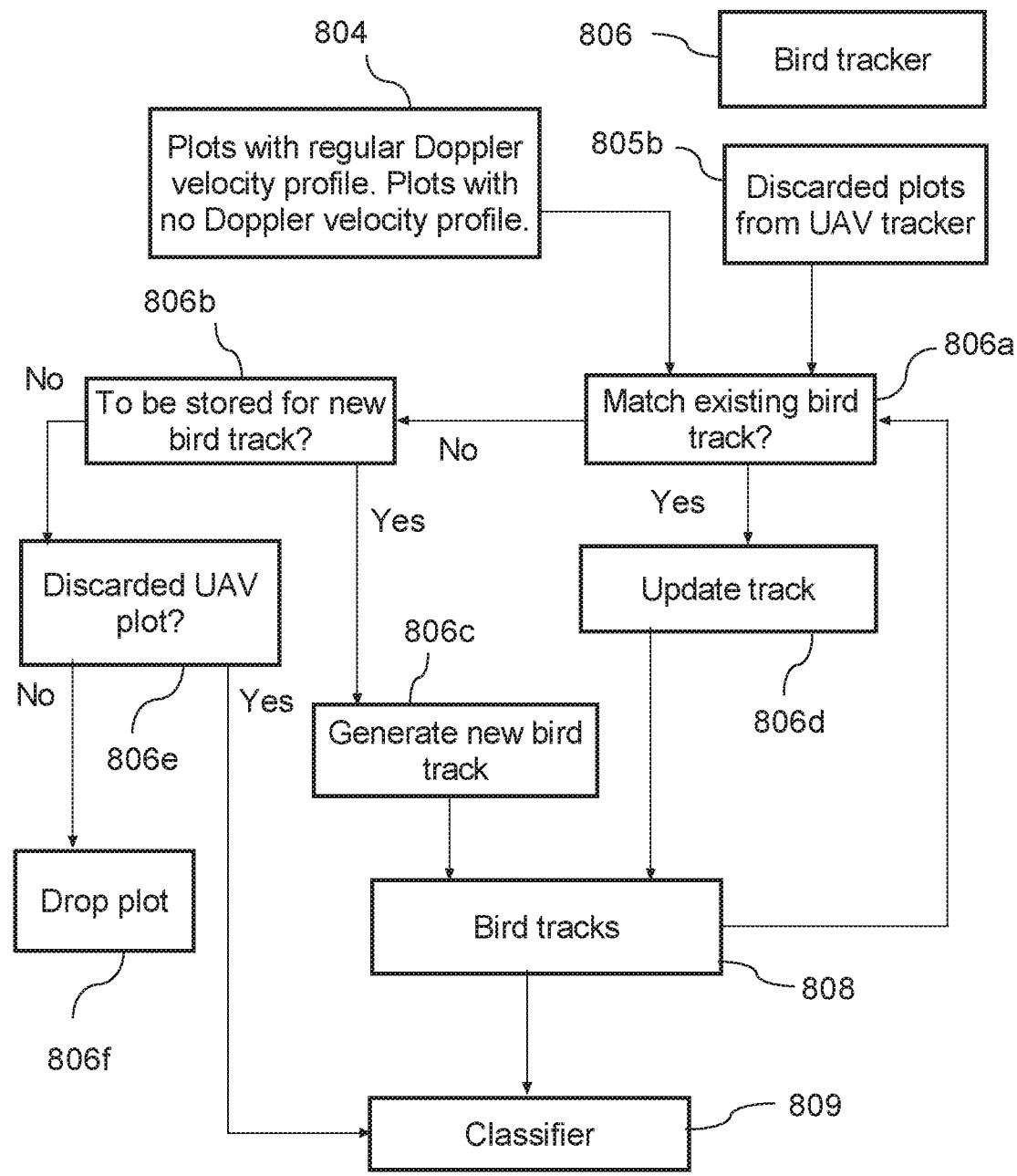
FIG. 12 is an overview flow diagram illustrating generation of bird tracks according to an example embodiment.

FIG. 12 is an overview flow diagram illustrating generation of bird tracks according to an example embodiment. The diagram of FIG. 12 corresponds to the bird tracker, step 806, of FIG. 8. The tracking process 806 is based on the plots with regular Doppler velocity profile from step 804 and the plots with no Doppler velocity profile from steps 801 and 804, but may also include the plots being discarded from the UAV tracker, step 805*b*. The first step is to analyse if a plot matches any existing bird tracks, step 806*a*. If no tracks has been generated yet, or if there is no match, the plot is stored and may be used for generating a new bird track, step 806*b*. If the plot gets too old without having a match with other plots to form a track, the stored plot may be discarded. In step 806*e* it is examined whether the discarded plot is a discarded UAV plot or not; if no, the plot is finally discarded or dropped, step 806*f*, if yes, the plot may be forwarded to the classifier, 809. If there are several stored plots having a match, such as at least two or three, but preferably at least four, five or six matching plots, a new bird track may be generated, step 806*c*, and stored as a bird track, step 808. The stored bird tracks are used in step 806*a* when matching a new plot with an existing bird track, and if there is a match, the matching bird track is updated with the data of the new plot, step 806*d*. The generated and stored bird tracks, 808, may then be classified, step 809, as further described in connection with FIG. 15.

Examples of matching conditions are known in the art of radar scanning and track generation, but a match condition may have to be fulfilled for a set of data, which are part of the plots being compared, when a new track is generated based on a number plots, while the data of a new plot has to match corresponding data of a stored track, when a new plot is used for updating an existing track. A match condition may be fulfilled for corresponding plot or track data, when the difference between the data being matched is below a predetermined threshold difference. This is further describe in connection with FIG. 13 for bird tracks and FIG. 14 for UAV tracks.

Figure 13:
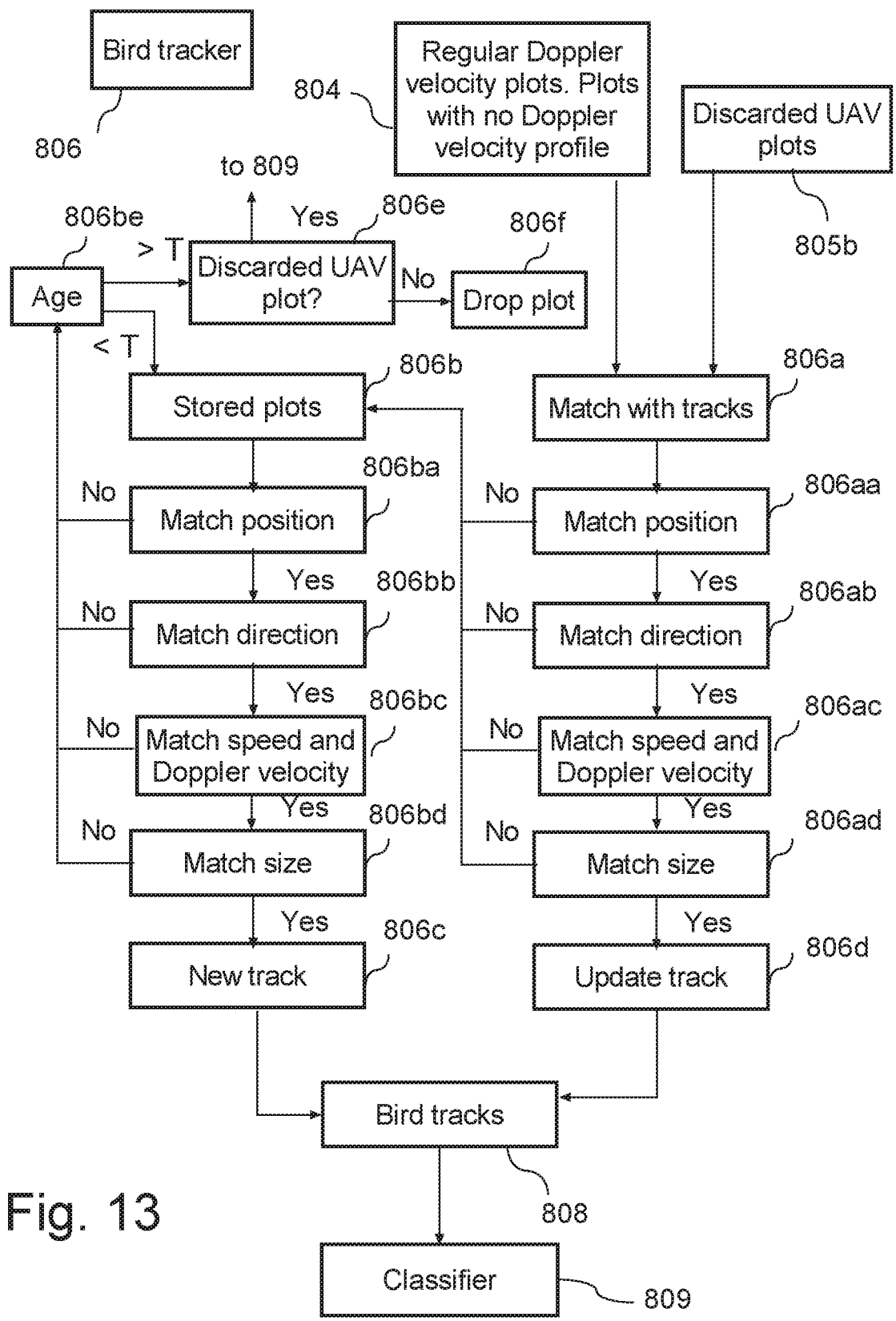
FIG. 13 is a detailed flow diagram illustrating generation of bird tracks according to an example embodiment.

FIG. 13 is a detailed flow diagram illustrating generation of bird tracks. The diagram of FIG. 13 corresponds to the bird tracker, step 806, of FIG. 8, and is a more detailed example of the bird tracking process of FIG. 12. Thus, the tracking process 806 is based on the plots with regular Doppler velocity profile and/or plots having no Doppler velocity profile found in step 804, and may also include the plots being discarded from the UAV tracker, step 805*b*. The first step is to analyse if a plot matches any existing bird tracks, step 806*a*. If there are any existing bird tracks, a number of data has to match: the position of the object being tracked has to match with the position of the object of the new plot, step 806*aa*, where the position may be based on range and azimuth data; the movement direction of the object being tracked has to match with the movement direction of the object of the new plot, step 806*ab*, where the movement direction of the track is based on the position of several plots, and the movement direction of the new plot means that the position of the new plot shall match the movement direction given in the track; the speed and Doppler radial velocity of the object being tracked have to match with the speed and Doppler radial velocity of the object of the new plot, step 806*ac*, where the speed of the track is based on changes in the position of several plots, and the speed of the new plot means that the position of the new plot shall match the speed and movement direction given in the track; the size of the object being tracked has to match with the size of the object of the new plot, step 806*ad*, where the object size may be based on a summation of the energy of return signals within a plot. If a new plot fulfils all the matching step, the matching bird track is updated with the data of the new plot, step 806*d*.

If no tracks has been generated yet, or if there is no match, the new plot is stored and may be used for generating a new bird track, step 806*b*. If the plot gets too old, i.e. being older than a given maximum time T, without having a match with other plots to form a track, the stored plot may be discarded. In step 806*e* it is examined whether the discarded plot is a discarded UAV plot or not; if no, the plot is finally discarded or dropped, step 806*f*, if yes, the plot may be to the classifier, 809. When several stored plots which are not too old have been obtained, these plots are examined to see if the number of matching conditions can be fulfilled to generate a new track. The matching conditions for plots to form a new tack may be similar the matching conditions for a new plot and an existing track: the position of the object of the plots has to match with each other, step 806*ba*, where position may be based on range and azimuth data; the movement direction of the objects of the plots has to match, step 806*bb*, where the movement direction is based on the position of the objects of several plots; the speed and Doppler radial velocity of the objects of the plots have to match, step 806*bc*, where the speed of the objects is based on changes in the object position of several plots; the size of the object of the plots has to match, step 806*bd*, where the object size may be based on a summation of the energy of return signals within a plot. If there are several stored plots having a match, such as at least two or three, but preferably at least four, five or six matching plots, a new bird track may be generated, step 806*c*, and stored as a bird track, step 808. The stored bird tracks are used in step 806*a* when matching a new plot with an existing bird track. The generated and stored bird tracks, 808, may then be classified, step 809, as further described in connection with FIG. 15.

Figure 14:
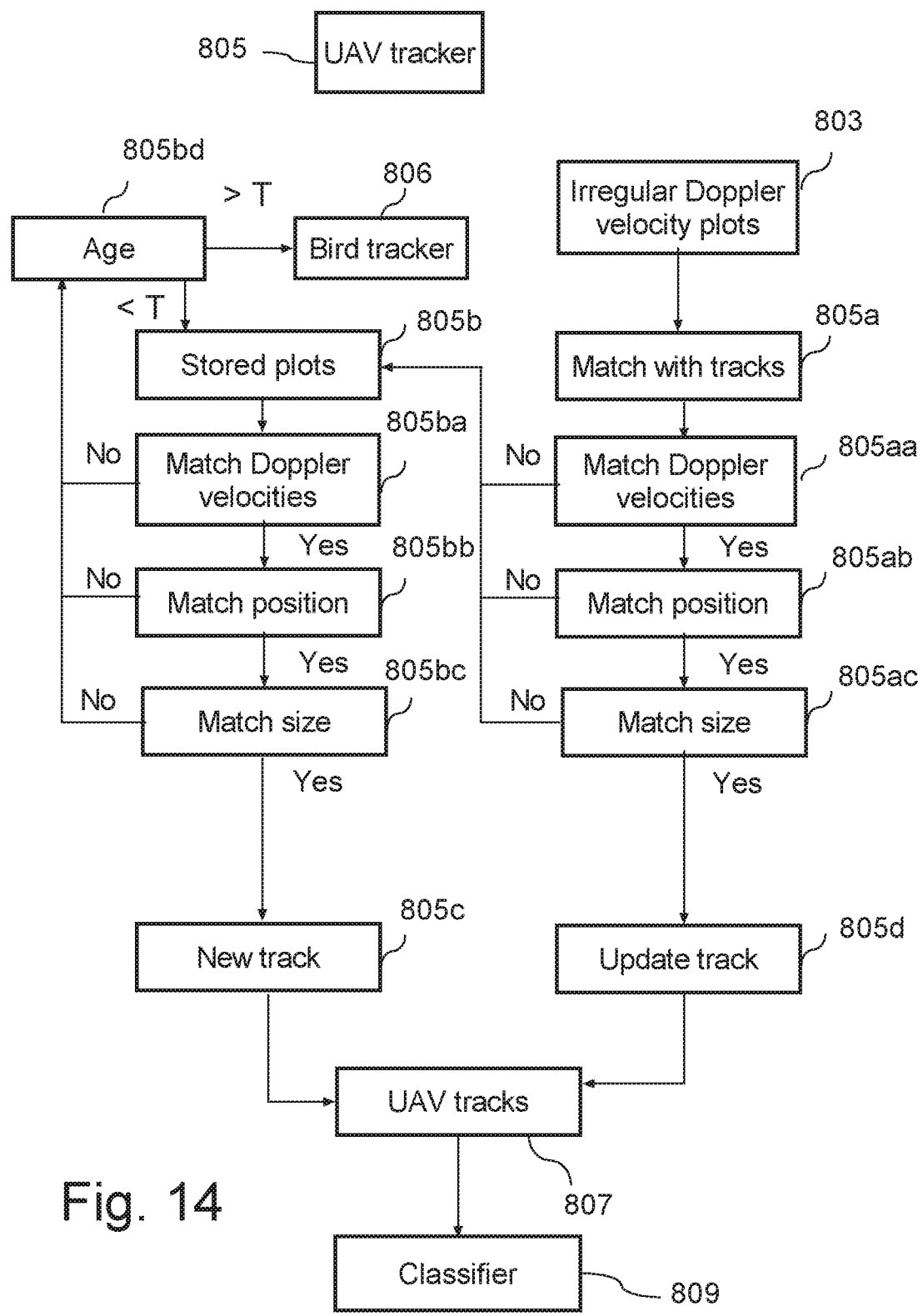
FIG. 14 is a detailed flow diagram illustrating generation of Unmanned Aerial Vehicle, UAV, tracks according to an example embodiment.

FIG. 14 is a detailed flow diagram illustrating generation of Unmanned Aerial Vehicle, UAV, tracks. The diagram of FIG. 14 corresponds to the UAV tracker, step 805, of FIG. 8, and is a more detailed example of the UAV tracking process of FIG. 11. Thus, the tracking process 805 is based on the plots with irregular Doppler velocity profile found in step 803.

The first step is to analyse if a plot matches any existing UAV tracks, step 805*a*. If there are any existing UAV tracks, a number of data has to match: the Doppler radial velocity of the object being tracked has to match with the Doppler radial velocity of the object of the new plot, step 805*aa*; the position of the object being tracked has to match with the position of the object of the new plot, step 805*ab*, where position may be based on range and azimuth data; the size of the object being tracked has to match with the size of the object of the new plot, step 805*ac*, where the object size may be based on a summation of the energy of return signals within a plot. If a new plot fulfils all the matching step, the matching UAV track is updated with the data of the new plot, step 805*d*.

If no tracks has been generated yet, or if there is no match, the new plot is stored and may be used for generating a new UAV track, step 805*b*. If the plot gets too old, i.e. being older than a given maximum time T, without having a match with other plots to form a track, the stored plot may be discarded, step 805*bd*. A discarded UAV plot may then be send to the bird tracker, step 806, to see if the plot fits into a bird track. When several stored plots which are not too old have been obtained, these plots are examined to see if the number of matching conditions can be fulfilled to generate a new track. The matching conditions for plots to form a new tack may be similar the matching conditions for a new plot and an existing track: the Doppler radial velocity of the objects of the plots has to match, step 805*ba*; the position of the objects of the plots has to match, step 805*bb*, where position may be based on range and azimuth data; the size of the objects of the plots has to match, step 805*bc*, where the object size may be based on a summation of the energy of return signals within a plot. If there are several stored plots having a match, such as at least two or three, but preferably at least four, five or six matching plots, a new UAV track may be generated, step 805*c*, and stored as a UAV track, step 807. The stored UAV tracks are used in step 805*a* when matching a new plot with an existing UAV track. The generated and stored UAV tracks, 807, may then be classified, step 809, as further described in connection with FIGS. 15 and 16.

An important aspect of the present invention is to provide data, which can be used for tracking and classification of UAVs or UAV like objects. Thus, the tracking of birds or bird like objects and also the classification of bird or bird like objects, may be optional for the systems and methods of the present disclosure. It is noted that all the objects being tracked by a UAV track has both positive and negative radial or Doppler velocities, which for example may indicate that a tracked object has one or more propeller blades; however flying objects with propeller blades may have very different sizes, where a UAV, which is unmanned, may have a rather small size and thereby a low energy or amplitude in the returned radar signals, while a manned helicopter will have a much higher energy or amplitude in the returned radar signals.

Figure 16:
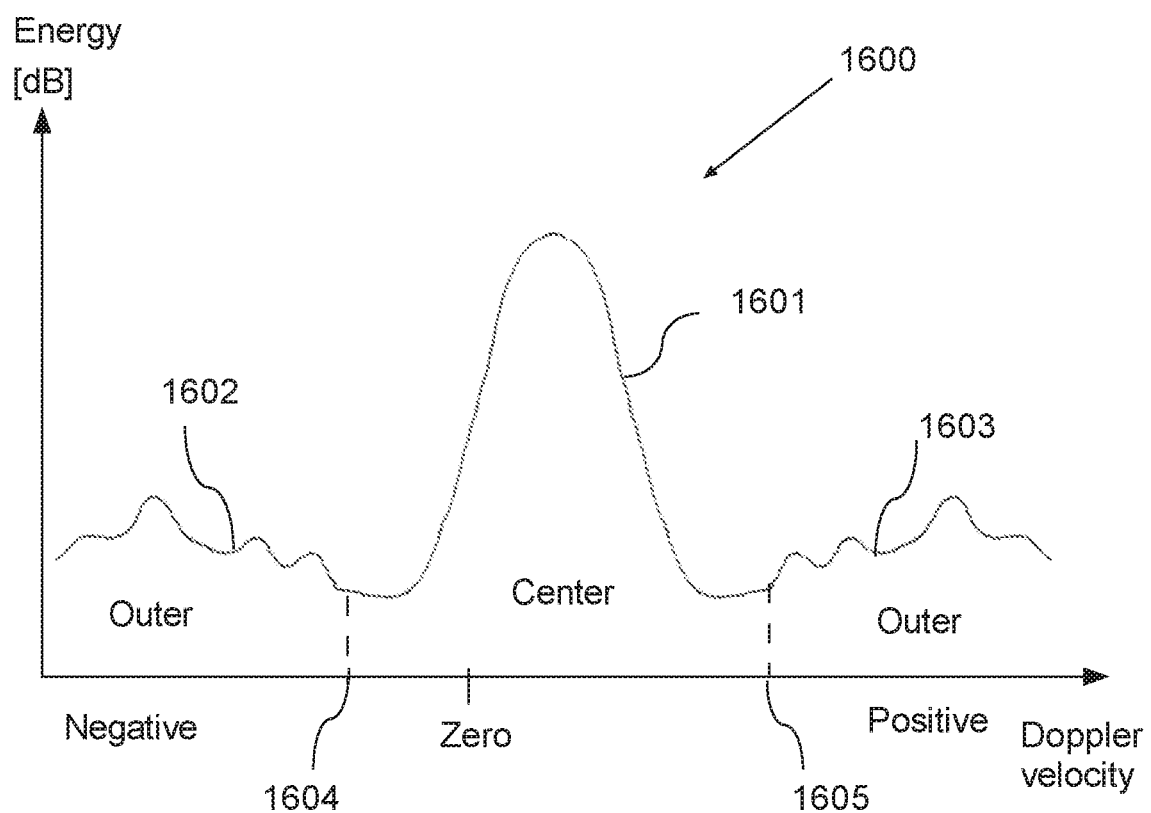
FIG. 16 is a graph illustrating reflected energy as a function of radial velocity for a tracked Unmanned Aerial Vehicle, UAV, according to an example embodiment.

For objects tracked by a UAV track, the received reflected energies represent a radial velocity span from an outer negative velocity to an outer positive velocity with most of the reflected energy representing radial velocities close to the center of the velocity span. This is illustrated in FIG. 16, which holds an energy curve 1600 illustrating reflected energy in dB as a function of radial velocity or Doppler velocity. The curve 1600 is based on the sum of return energies of range cells or bins of the Doppler signatures from plots forming a UAV track, where the range cells or bins have return energy data for different radial/Doppler velocities. The curve 1600 has a center part 1601 representing the highest amount of energy, which for this embodiment is centered around a slightly positive Doppler velocity. The center part 1601 represents return energies, which may correspond to a center body of a UAV. The curve 1601 also has a negative outer energy part 1602 and a positive outer energy part 1603. The outer energy parts 1602 and 1603 represent return energy within the so-called micro-Doppler range, and may correspond to energy being reflected from propeller blades of a UAV.

For the curve 1601, the boundary between the center part 1601 and the outer energy parts 1602 and 1603 is set at limiting velocities 1604 and 1605. For the embodiment illustrated in FIG. 16, the energy level of the center part 1601 decreases to a minimum on both sides of the maximum energy velocity, and then the energy slowly starts increasing again. The limiting velocities 1604, 1605 are selected as the velocities where the energy has increased by 3 dB from the minimum energy.

For a flying object, such as a UAV, the micro-Doppler signals must have a certain strength compared to the strength of the center body signals in order for the propeller blades to keep the UAV flying. In FIG. 16, the strength of the micro-Doppler signals is represented by the sum of energies within the outer energy parts 1602 and 1603, and the strength of the center body signals is represented by the sum of energies within the center part 1601. Thus, in order to classify an object of a UAV track as a UAV, the strength of the outer Doppler velocity signals should be above a certain or predetermined fraction of the strength of the center Doppler velocity signals. Here, the strength of the outer Doppler velocity signals may be no less than 1/1000 of the strength of the center Doppler velocity signals, or the strength of the outer Doppler velocity signals should not be more than 30 dB weaker than the strength of the center Doppler velocity signals.

As mentioned above, flying objects of a UAV track may vary in size, where a manned helicopter will have a much higher energy or amplitude in the returned radar signals. Thus, if the total strength of the received Doppler velocity signals as represented by the sum of return energies for all Doppler velocity signals, which for the curve 1600 of FIG. 16 would be the total sum of the energies of the center part 1601 and the energies of the outer parts 1602 and 1603, is above a certain or predetermined maximum, the object track may be classified as a non-UAV track. Here, if the total sum of return energies represents an object having a radar cross-section, RSC, above 1 $m^2$, the track may be classified as a non-UAV track.

Figure 15:
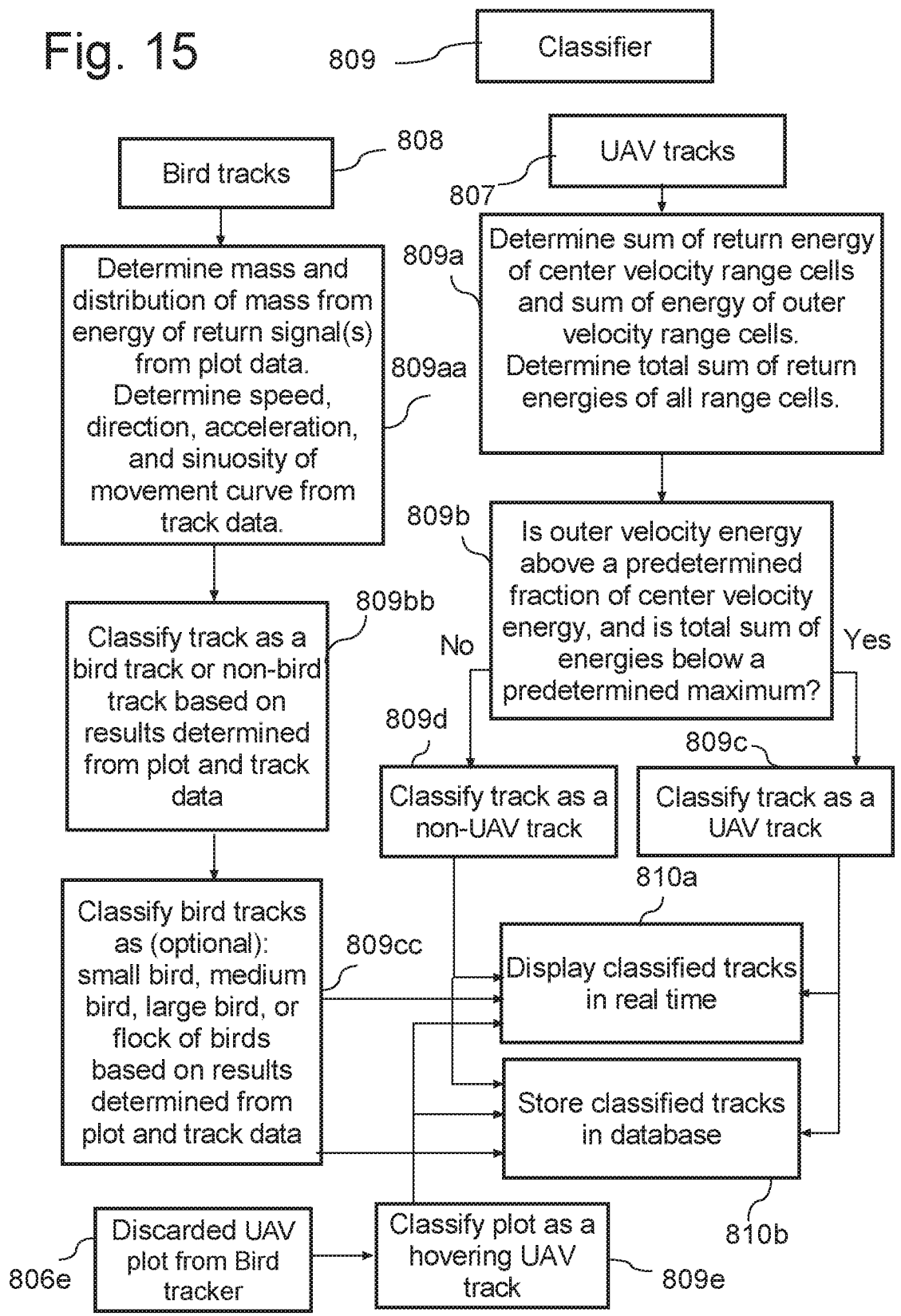
FIG. 15 is a flow diagram illustrating classification of obtained tracks according to an example embodiment.

FIG. 15 is a flow diagram illustrating classification of obtained tracks according to an example embodiment. FIG. 15 illustrates classification, 809, of detected objects being part of UAV tracks, 807, and of detected objects being part of bird tracks, 808, where the classification of bird or bird like objects, may be optional. The first step, step 809*a*, in the process of the classification of UAV tracks may be to determine the sum of return energies for range cells representing Doppler velocities within a center range of the observed velocity range, and to determine the sum of return energies for range cells representing positive and negative Doppler velocities within the outer ranges of the observed velocity range. Step 809*a* may also comprise determining the total sum of return energies of range cells for all Doppler velocity signals, which sum of return energies represents a total body mass with a corresponding radar cross-section.

The next step, step 809*b*, is then to determine, if the summed outer velocity energy is above a predetermined fraction of the summed center velocity energy. Alternatively, it may be determined if the summed outer velocity energy is above a predetermined fraction of the total summed velocity energy. If no, the track is classified as a non-UAV track, step 809*d*, and if yes, the track may be a UAV track. However, in step 809*b*, it is also determined if the total summed velocity energy is below or equal to a summed energy representing a total body mass with a predetermined maximum radar cross-section. If no, the track is classified as a non-UAV track, step 809*d*, and if yes, the track may be classified as a UAV track, if there is also a yes to the requirements to the summed outer velocity energy, step 809*c*.

For the present embodiment, the tracks are classified by the computer system 102, from where the classified tracks are forwarded by live streaming to the command and control system 103, where the classified tracks may be displayed in real time, 810*a*, and then stored in a database, step 810*b*.

Thus, an important result of the radar scanning processes described herein, is the display in real time of the generated and classified UAV tracks at the command and control system 103. Based on information of the displayed tracks, the people at the command and control center have the possibility to decide if any actions are needed against any detected UAV.

A major difference in radar based scanning of birds and UAVs is that a very high number of bird plots, here regular Doppler velocity profile plots, such as up to 1000 to 5000 plots, may be generated, while only very few UAV plots, here irregular Doppler velocity profile plots, such as two, four or six plots, may be generated. Thus, only a single or very few UAV objects may be tracked, while many more birds or flocks of bird may have to be tracked and distinguished from each other, whereby the bird tracking and classification needs to more precise and therefore based on a higher number of variables than the UAV tracking and classification, where for the UAV tracking the radial or Doppler velocity profiles give the most important information.

The first step in the process of the classification of bird tracks may therefore be to determine further parameters based on data of obtained tracks, as illustrated in step 809aa. Here, the total object mass and distribution of the object mass is determined from energy of return signal(s) from plot data, where the mass distribution may be determined based on the return energy data of the bins of the Doppler signatures of a plot. Furthermore, speed, direction, acceleration, and sinuosity of the movement curve may be determined from the object track data.

Based on the obtained results determined from a track and the corresponding plots, the track can be classified as a bird track, or as a non-bird track, step 809cc. Here, a non-bird object may be an aeroplane, which has a much bigger size and object mass, and which can have a higher speed and better sinuosity than a bird or flock of birds. For tracks classified as bird tracks, then based on results determined from the plots and track data, the track may be classified as a small bird track, a medium bird track, a large bird track, or a flock of birds tracks. Here, the size or object mass may be used to classify a bird as small, medium, or large, while sinuosity or lack of sinuosity may be a good parameter classifying the object as a flock of birds. For systems including bird tracking and classification, the classified bird tracks may be forwarded by live streaming to the command and control system 103, where the classified tracks may be displayed in real time, 810a, and then stored in a database, step 810b.

It is noted that a discarded UAV plot, which has not been matched with any bird tracks, 806e, may be classified as a track in itself, which can be a so-called "hovering UAV track", which may also be forwarded by live streaming to the command and control system 103, where the classified tracks may be displayed in real time, 810a, and then stored in a database, step 810b.

The foregoing description in connection with FIGS. 1 to 16 has dealt with a FMCW radar scanning system for detecting objects, and procedures or methods for generating radar plots and tracks based on obtained scan data. The generation of tracks includes generation of tracks qualifying as Unmanned Aerial Vehicle, UAV, tracks, and procedures are also described for classifying a generated UAV track as a real UAV track.

It is, however, within embodiments of the present disclosure to provide a system, which is able to detect and track UAVs, and which further is able to distinguish between known and unknown UAVs. Such a system may also be configured to control operation of a known UAV based on obtained tracking information of an unknown UAV. Such as system is shown in FIG. 17, which is a schematic block diagram illustrating the basic structure of an Unmanned Aerial Vehicle, UAV, system according to an example embodiment.

Figure 17:
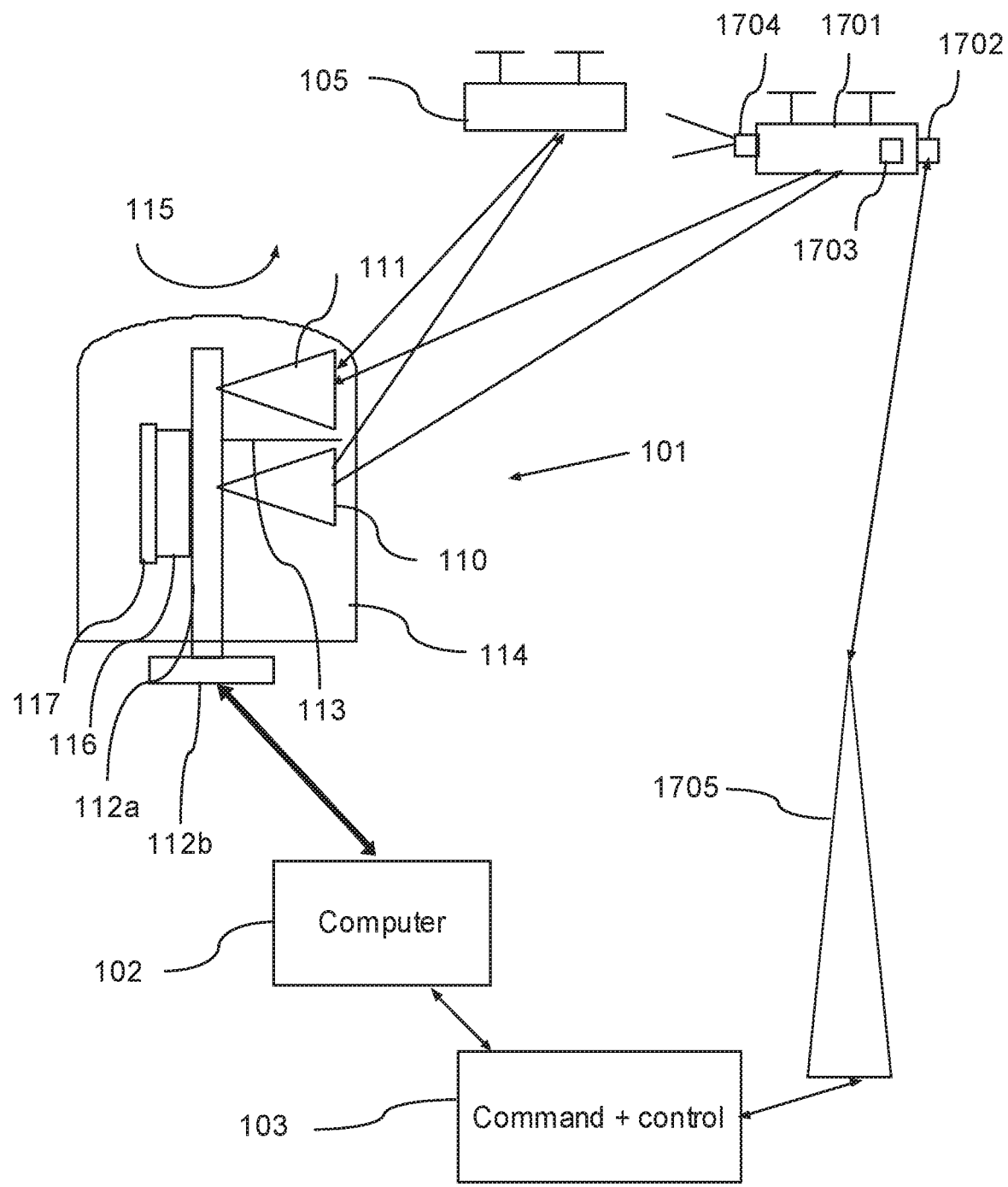
FIG. 17 is a schematic block diagram illustrating the basic structure of an Unmanned Aerial Vehicle, UAV, system according to an example embodiment.

The system of FIG. 17 holds a FMCW scanning radar system 101 electronically connected to a computer system 102, which are equal to the radar and computer systems 101 and 102 of FIG. 1a. Generated output data from the computer system 102 is communicated to an external command and control system or station 103, which is also shown in FIG. 1a. The system of FIG. 17 further comprises a known, first co-operating Unmanned Aerial Vehicle, UAV, 1701 and an antenna 1705. The co-operating UAV 1701 is provided with a telemetric transmitter/receiver 1702 for exchanging telemetric radio frequency, RF, data with the antenna 1705, which is further in data communication with the command and control station 103, whereby the flight path of the co-operating UAV 1701 can be controlled from the command and control station 103. The co-operating UAV 1701 also holds a camera 1704, such as a video camera, whereby live video signals can be transmitted from the UAV 1701 via the antenna 1705 to the command and control station 103. The co-operating UAV 1701 may also be provided with a transponder 1703 holding identification information, ID, for the UAV 1701, whereby transponder data holding the identification information may be forwarded from the UAV 1701 to the command and control station 103. The co-operating UAV 1701 may also hold a global positioning system, GPS, which is not shown in FIG. 17, and the telemetric data forwarded to the command and control station 103 may hold position data obtained from the GPS system.

In FIG. 17, the co-operating UAV 1701 is exposed to radar signals from the radar system 101 and thereby detected by the radar system 101. FIG. 17 also shows a second Unmanned Aerial Vehicle, UAV, 105, which in this case is an unknown or non-co-operating UAV, 105, which is not in telemetric communication with the command and control system 103. Thus, radar scan data are obtained by the radar system 101 for both the first UAV 1701 and the second UAV 105, which scan data may be processed by processing circuitry of the computer system 102 to obtain radar plots and object tracks for the detected UAVs 105 and 1701. Furthermore, the command and control system 103 receives the telemetric data and possible also transponder data from the first UAV 1701, which can be forwarded to the computer system 102 and compared with the obtained UAV track data. The final result of such a comparison may be a classification of the obtained UAV tracks, to thereby make a distinction between a track of a known, co-operating UAV, and a track of an unknown, non-co-operating UAV. The classified UAV tracks may be forwarded and displayed in real time at the command and control system 103.

Based on information of the displayed tracks, the people at the command and control center station 103 have the possibility to decide if any actions are needed against any detected UAV, and flight path commands and possible also action commands may be forwarded via telemetric communication to the known, co-operating UAV 1701, which may adapt its flight path accordingly and execute any received action commands accordingly.

Figure 18:
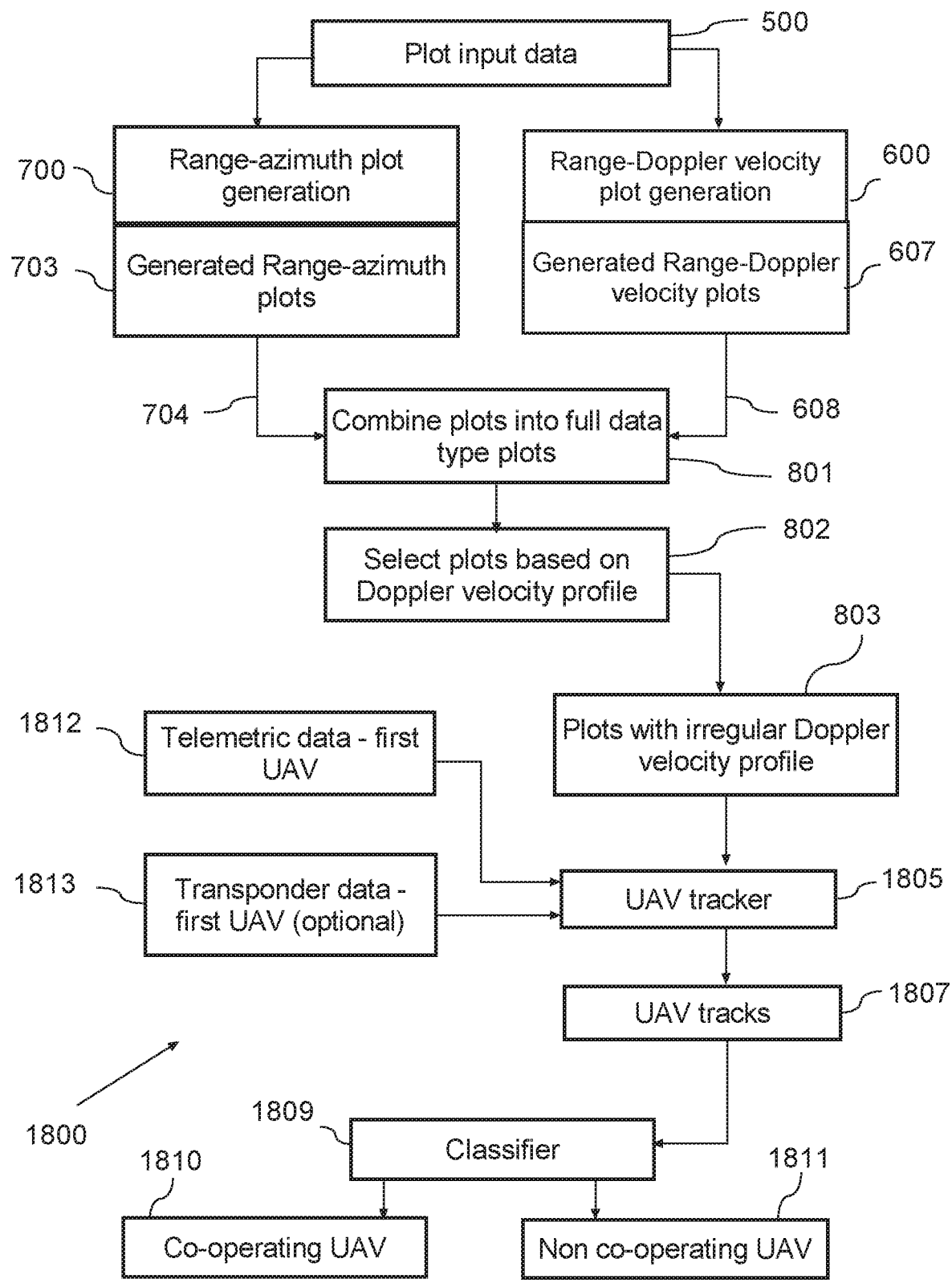
FIG. 18 is an overview flow diagram illustrating processing steps including plot generation, track generation and classification of a detected object based on data obtained by the system of FIG. 17 according to an example embodiment.
Figure 19:
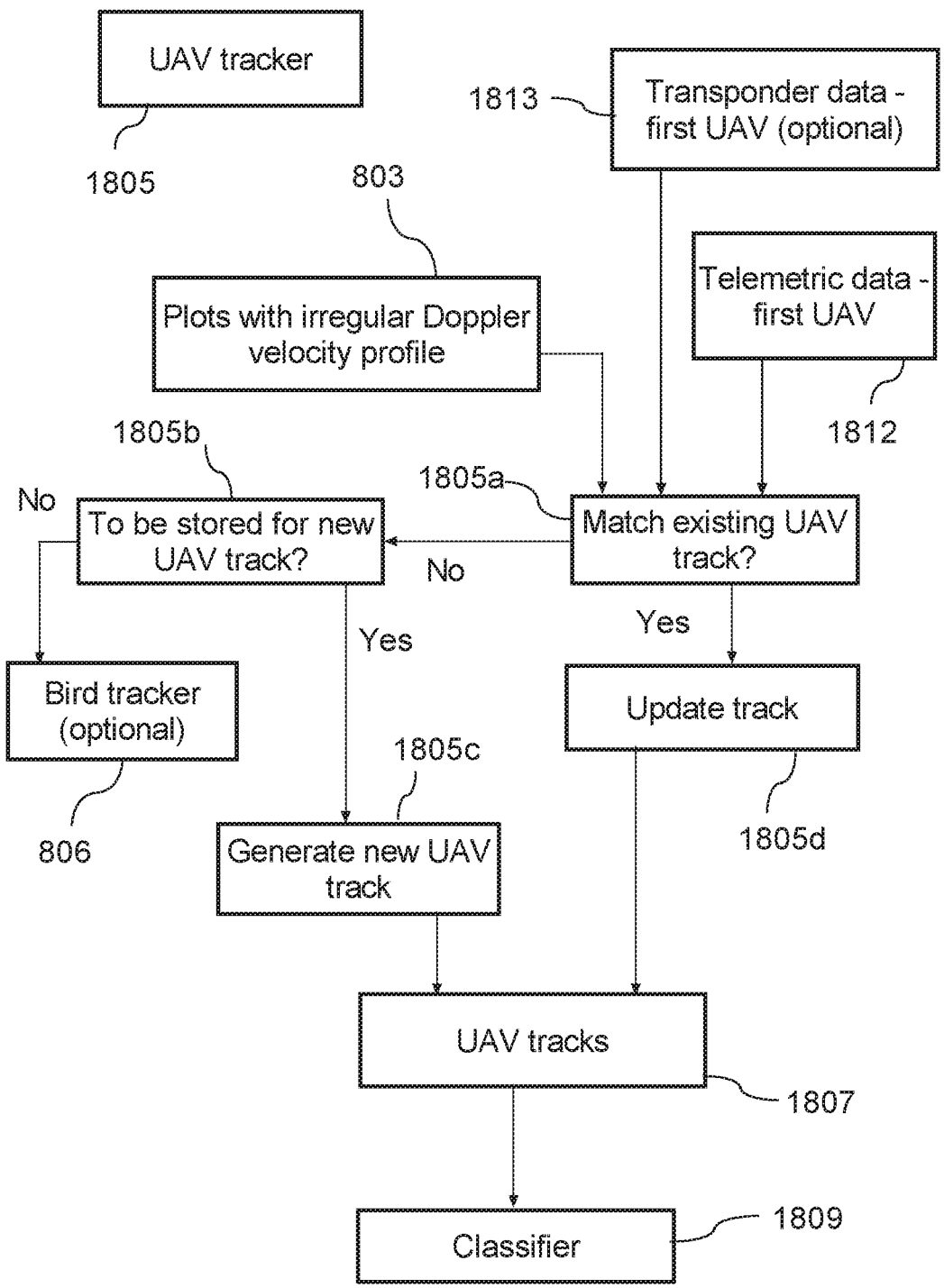
FIG. 19 is an overview flow diagram illustrating generation of Unmanned Aerial Vehicle, UAV, tracks based on data obtained by the system of FIG. 17 according to an example embodiment.

The formation and classification of UAV tracks for known and unknown UAVs is illustrated in FIGS. 18 and 19, for which FIG. 18 is an overview flow diagram illustrating processing steps including plot generation, track generation and classification of a detected object based on data obtained by the system of FIG. 17 according to an example embodiment. The first part of the steps of FIG. 18 follows the first part of the steps of FIG. 8, which again refers to the generation of plot input data, step 500, from FIG. 5, the generation of range-Doppler velocity plots, steps 600 and 607, from FIG. 6, and the generation of range-azimuth plots, steps 700 and 703, from FIG. 7.

From the obtained range-Doppler velocity plots, 703, and the obtained range-azimuth plots, 703, the process proceeds by comparing and combining the obtained plots, 608 and 704, into full data type plots, step 801, which is further described in connection with FIG. 9. It is noted that during the following circular radar scan, new range-Doppler plots are generated and stored during the scan, while new range-azimuth plots are first generated and stored when the following circular radar scan is completed. This procedure of plot generation is repeated for each full circular radar scan.

When comparing the obtained range-Doppler velocity plots and range-azimuth plots at step 801 in FIG. 8, the range-azimuth plots, which cannot be matched with a range-Doppler velocity plot, is forwarded to a so called "Bird tracker" 806 via step 804. The range-Doppler velocity plots, which cannot be matched with a range-azimuth plot is discarded. However, for the processing steps of FIG. 18, we only need to look at plots qualifying for the generation UAV tracks, so for step 801 the range-azimuth plots, which cannot be matched with a range-Doppler velocity plot may be forwarded to a "Bird tracker" or may be discarded together with the range-Doppler velocity plots, which cannot be matched with a range-azimuth plot.

The remaining plots in step 801 are combined into full data type plots, which now hold range, azimuth, radial velocity, and return energy data for detected objects forming part of a plot. The next step is to select the full data type plots qualifying for the generation of UAV tracks, and this selection is based on Doppler velocity profile, step 802, which is further described in connection with FIG. 10. The combined plot, which are selected as qualifying for the generation of UAV tracks, are the plots with irregular Doppler velocity profile, step 803, where irregular type radar plots have velocity data representing positive and negative radial velocities within an observed radial velocity range. The selected irregular type radar plots may have velocity data representing positive and negative radial velocities with at least a predetermined minimum velocity difference between the most positive radial velocity and the most negative radial velocity.

The plots with irregular Doppler velocity profile are fed to a so called "Unmanned Aerial Vehicle, UAV, tracker", step 1805, for generating so-called "UAV tracks", step 1807, which is further described in connection with FIG. 19. In step 1805, a UAV track is formed based on at least two matching plots with irregular Doppler profile. However, the UAV tracker, step 1805, also receives telemetric data, if any, step 1812, and transponder data, if any, step 1813, which telemetric and transponder data may originate from a known UAV. Any received UAV telemetric and transponder data are stored together with the UAV track data, step 1807.

The obtained UAV tracks 1807 now go through a classification process, step 1809, resulting in classified real UAV tracks. An example of a classification process, which may be used in step 1809 for classifying a UAV track as a real UAV track, is described in connection with FIG. 15. The UAV track being classified as real UAV tracks are now further classified as representing a first, known or co-operating UAV, step 1810, or representing a second, unknown or non-co-operating UAV, step 1811. The real UAV tracks having a match between corresponding track data and received telemetric and/or transponder data, are classified as co-operating UAV tracks, step 1810, and real UAV tracks having no match between corresponding track data and received telemetric and/or transponder data, are classified as non-co-operating UAV tracks, step 1811.

FIG. 19 is an overview flow diagram illustrating generation of Unmanned Aerial Vehicle, UAV, tracks based on data obtained by the system of FIG. 17 according to an example embodiment. The diagram of FIG. 19 corresponds to the UAV tracker 1805 of FIG. 18, and may hold the same steps as described in connection with the UAV tracker 805 of FIG. 11. The main difference being that the UAV tracker, 1805, of FIGS. 18 and 19 also receives telemetric data, if any, step 1812, and transponder data, if any, step 1813, which telemetric and transponder data may originate from a known UAV.

Thus, the tracking process 1805 is based on the plots with irregular Doppler velocity profile found in step 803. The first step is to analyse if a plot matches any existing UAV tracks, step 1805*a*. If no tracks has been generated yet, or if there is no match, the plot is stored and may be used for generating a new UAV track, step 1805*b*. If the plot gets too old without having a match with other plots to form a track, the stored plot may be discarded or may be fed into the bird tracker, step 806. If there are several stored plots having a match, such as at least two or three, but preferably at least four, five or six matching plots, a new UAV track may be generated, step 1805*c*, and stored as a UAV track, step 1807. The stored UAV tracks are used in step 1805*a* when matching a new plot with an existing UAV track, and if there is a match, the matching UAV track is updated with the data of the new plot, step 1805*d*. It is also in steps 1805*a* and 1805*d* that received telemetric data and/or transponder data are matched with the data of the generated UAV tracks, and then stored together with the data of the matching tracks at step 1807. The generated and stored UAV tracks, 1807, may then be classified a real or non-real UAV tracks, step 1809, and further classified as representing a first, known or co-operating UAV, step 1810 of FIG. 18, or representing a second, unknown or non-co-operating UAV, step 1811 of FIG. 18.

When matching plots with irregular Doppler velocity profile in order to generate a UAV track, 1805*c*, or match a plot to an existing UAV track, 1805*a*, the matching may comprise to determine if there is a match between radial velocity data, range data, and return energy data. The matching of return energy data of two irregular type radar plots may be based on a total sum of return energies representing all radial velocity signals for each of the two irregular type radar plots being matched, and/or the based on a sum of center return energies corresponding to a centered radial velocity span within the observed radial velocity range for each of the two irregular type radar plots being matched. A match condition may be fulfilled for a set of corresponding data if the difference between the data is equal to or below a predetermined threshold difference.

When matching the received telemetric data and/or transponder data with the data of the generated UAV tracks, steps 1805*a* and 1805*d*, predetermined matching conditions may have to be fulfilled between data of the stored tracks and the received telemetric data and/or transponder data. Here, the matching conditions may comprise a match between position data, a match between velocity data and/or a match between size data. Also here, a match condition may be fulfilled for a set of corresponding data if the difference between the data is equal to or below a predetermined threshold difference.

Figure 20:
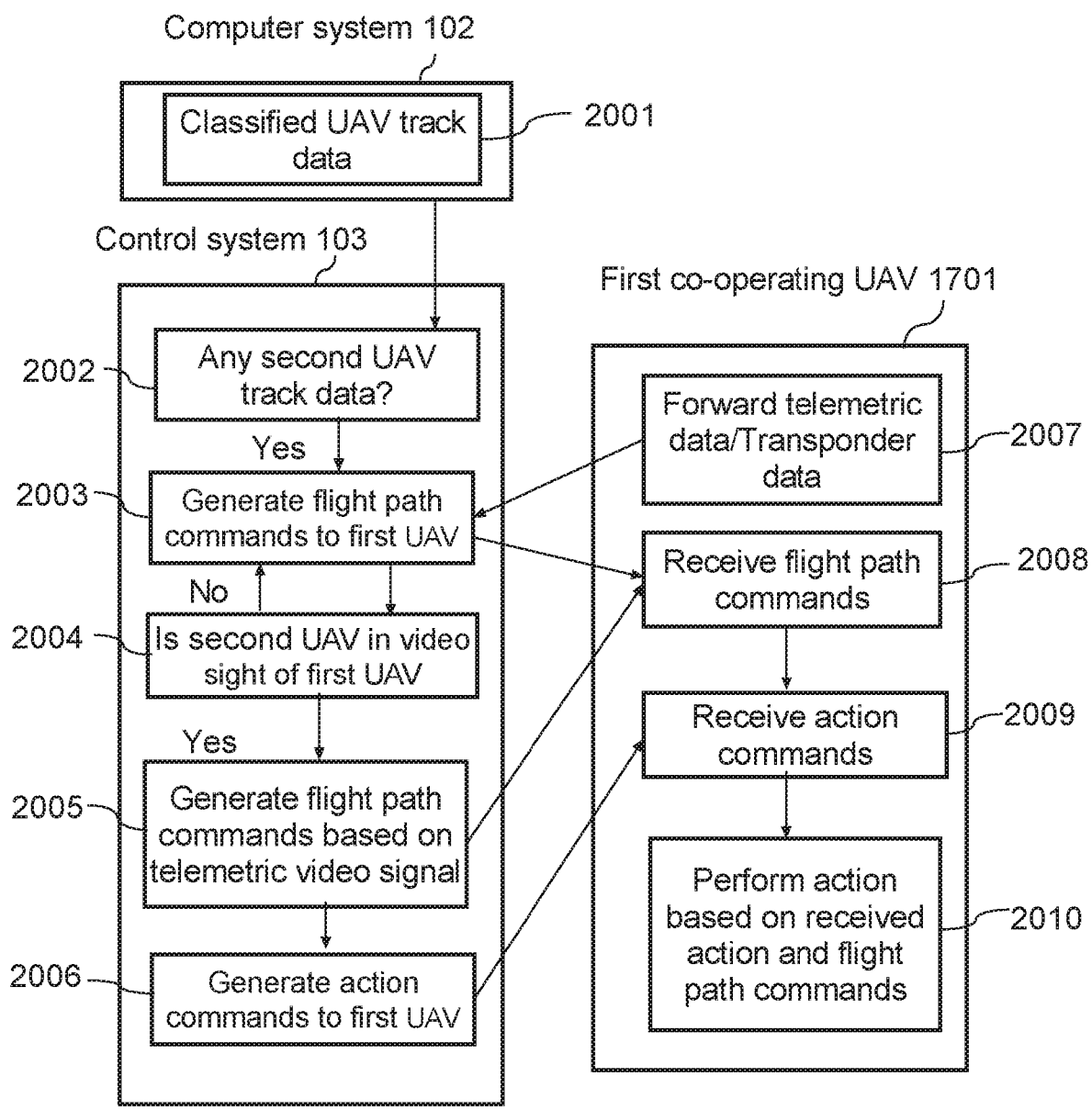
FIG. 20 is a block diagram illustrating exchange of signals between parts of the system of FIG. 17 according to an example embodiment.

FIG. 20 is a block diagram illustrating exchange of signals between parts of the system of FIG. 17 according to an example embodiment. The radar system 101 provides scan data which is processed by the computer system 102 into UAV tracks. The command and control station 103 receives telemetric data and/or transponder data from the first, co-operating UAV, which may further be forwarded to the computer system 102, which then classify the obtained UAV tracks into co-operating UAV tracks and non-co-operating UAV tracks, step 2001. Track data for the classified tracks is then forwarded to the command and control station 103.

From the received track data, the command and control station 103 determines whether there is any second, non-co-operating UAV tracks, step 2002. If yes, the command and control station 103 starts generating and forwarding flight plan commands, step 2003, to the first co-operating UAV 1701 based on object data from the object track of the second non-co-operating UAV 105 and based on telemetric data and/or transponder data received from the first co-operating UAV 1701, step 2007. The first co-operating UAV 1701 receives the flight path commands as indicated by step 2008.

The first co-operating UAV 1701 holds a camera 1704, and the telemetric data received by the command and control station 103 including a video signal. Based on the received telemetric data, the command and control station 103 determines whether the second non-co-operating UAV 105 is in video sight of the first co-operating UAV 1701, step 2004. If yes, the command and control station 103 starts generating and forwarding flight plan commands to the first co-operating UAV 1701 based on the received telemetric video signal, step 2005.

It is within an embodiment that the command and control station 103 is configured to generate and forward the flight plan commands based on position data obtained from the object track of the second non co-operating UAV 105, step 2003, until the second non co-operating UAV 105 is detected within the received video signal, step 2005. At this point in time, the command and control station 103 may be configured to generate and forward the flight plan commands based on the received video signal only.

When the UAV of a UAV object track is classified as a second non-co-operating UAV 105, it is within an embodiment that the command and control circuitry 103 is configured to generate and forward action commands to the first UAV 1701 based on information obtained from the object track of the second UAV 105, steps 2006 and 2009. The action commands may also be at least partly based on the received telemetric data and/or transponder data for the first co-operating UAV 1701. The first co-operating UAV 1701 may then be configured to execute an action, step 2010, based on the action commands received from the command and control station 103. The execution of the action may also be based on received flight path commands.

According to an embodiment the action and flight path commands may comprise a flight disturbing action command, whereby the first co-operating UAV 1701 is configured to execute a flight-route or flight plan disturbing action for the second non co-operating UAV 105. Here, the flight-route or flight plan disturbing action to be executed may be to divert the first co-operating UAV 1701 towards the second non co-operating UAV 105 to induce a collision between the first and second UAVs, 1701, 105.

The command and control station 103 may generate the flight plan information and/or action information based on position, velocity and/or size data obtained from the object track of the second non-co-operating UAV 105. Here, the position data may include range and azimuth relative to the radar system, and the velocity data may include the radial velocity relative to the radar system. The size data may be determined based on energy of return scan signals within plots forming the object track of the second non-co-operating UAV 105.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A Frequency Modulated Continuous Wave, FMCW, radar system comprising:
   one or more antennas configured to transmit and receive FMCW radar wave signals for scanning for objects, such as unmanned aerial vehicles, UAVs, within a full circular detection coverage range; and
   processing circuitry configured to:
   provide scan data based on transmitted and received FMCW radar signals and azimuth position of the antenna(s), said scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s) and wherein an object, which is detected within an azimuth orientation and range to the radar antenna(s), is represented by a number of hit range cells in one or more image lines,
   and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object; and
   generate full data type radar plots based on obtained scan data, each said full data type radar plot holding azimuth, range, radial velocity and received return energy data for one or more detected objects;
   characterized in that the processing circuitry is further configured to:
   select irregular type radar plots from full data type radar plots, said irregular type radar plots having velocity data representing both positive and negative radial velocities within an observed radial velocity range, and said irregular type radar plots having at least a predetermined minimum velocity difference between the observed radial velocity with the largest positive value and the observed radial velocity with the largest absolute negative value; and to generate one or more object tracks or unmanned aerial vehicle, UAV, tracks, where each object/UAV track is based on at least two irregular type radar plots having a match between corresponding data of said at least two irregular type radar plots.

2. A FMCW radar system according to claim 1, wherein the system is configured to provide scan data indicative of radial velocities within a predetermined positive velocity range and a predetermined negative velocity range of same size as the predetermined positive velocity range, and
   wherein the predetermined minimum velocity difference between the observed radial velocity with the largest positive value and the observed radial velocity with the largest absolute negative value is at least 50% the combined predetermined positive and negative velocity ranges.

3. A FMCW radar system according to claim 2, wherein the system is configured to provide scan data indicative of relative velocities within the range of −30 to +30 m/s, and
   wherein the predetermined minimum velocity difference between the observed radial velocity with the largest positive value and the observed radial velocity with the largest absolute value is at least 45 m/s.

4. A FMCW radar system according to claim 1, wherein said match between corresponding data comprises a match between radial velocity data, a match between range data, and/or a match between return energy data.

5. A FMCW radar system according to claim 1, wherein the processing circuitry is configured to:
determine for the plots of a generated object/UAV track:
an outer energy sum being the sum of return energies for range cells representing positive and negative radial velocity signals within outer velocity ranges of the observed radial velocity range;
a center energy sum being the sum of return energies for range cells representing radial velocity signals within a center range of the observed radial velocity range, and/or a total energy sum being the total sum of return energies of range cells representing all radial velocity signals of the observed radial velocity range; and
wherein the processing circuitry is further configured to:
classify the object/UAV track as a real UAV track or non-real UAV track based at least partly on a comparison of the determined outer energy sum with the determined center energy sum and/or with the determined total energy sum.

6. A FMCW radar system according to claim 5, wherein the processing circuitry is configured to:
classify the object/UAV track as a non-real UAV track when the determined outer energy sum is below a predetermined fraction of the determined center energy sum, wherein the predetermined fraction of the determined center energy sum is $1/1000$.

7. A FMCW radar system according to claim 5, wherein the processing circuitry is configured to:
classify the object/UAV track as a non-real UAV track when the determined outer energy sum is below a predetermined fraction of the determined total energy sum.

8. A FMCW radar system according to claim 5, wherein the processing circuitry is configured to:
classify the object/UAV track as a real UAV track or non-real UAV track based at least partly on a comparison of the determined total energy sum with a predetermined maximum energy representing a predetermined maximum radar cross-section.

9. A FMCW radar system according to claim 5, wherein the processing circuitry is configured to: classify the object/UAV track as a non-UAV or large UAV track when the determined total energy sum is above a predetermined maximum energy representing a predetermined maximum radar cross-section, wherein the predetermined maximum radar cross-section is 1 m$^2$.

10. A FMCW radar system according to claim 5, wherein the processing circuitry is configured to: classify the object/UAV track as a real UAV track when the determined outer energy sum is above a predetermined fraction of the determined center energy sum and/or above a predetermined fraction of the determined total energy sum, and when the determined total energy sum is below a predetermined maximum energy representing a predetermined maximum radar cross-section.

11. A FMCW radar system according to claim 1, wherein the processing circuitry is configured to:
generate full data type radar plots based on grouping of neighboring hit range cells within one or more image lines of a full circular radar image having matching range, azimuth and radial velocity data.

12. A Frequency Modulated Continuous Wave, FMCW, radar system comprising:
one or more antennas configured to transmit and receive FMCW radar wave signals for scanning for objects, such as unmanned aerial vehicles, UAVs, within a full circular detection coverage range; and
processing circuitry configured to:
provide scan data based on transmitted and received FMCW radar signals and azimuth position of the antenna(s), said scan data representing range cells within image lines of circular radar images, where each radar image holds a number of image lines defining a full circular radar image, with each image line corresponding to an azimuth orientation, and where each image line holds a number of range cells, with each range cell corresponding to a distance to the radar antenna(s), and wherein an object, which is detected within an azimuth orientation and range to the radar antenna(s), is represented by a number of hit range cells in one or more image lines, and wherein each hit range cell holds data for energy of returned signal(s) and data for radial velocity or velocities based on Doppler frequency signals, said scan data thereby for each hit range cell holding information of range, azimuth orientation, energy of returned radar wave signals, and radial velocity or velocities of a detected object; characterized in that
the processing circuitry is further configured to:
generate full data type radar plots based on obtained range cell scan data, each said full data type radar plot holding azimuth, range, radial velocity and received return energy data for one or more detected objects;
select irregular type radar plots from full data type radar plots, said irregular type radar plots having velocity data representing both positive and negative radial velocities within an observed radial velocity range;
generate one or more object tracks or unmanned aerial vehicle, UAV, tracks, where each object/UAV track is based on at least two irregular type radar plots having a match between corresponding data of said at least two irregular type radar plots;
determine for the plots of a generated object/UAV track:
an outer energy sum being the sum of return energies for range cells representing positive and negative radial velocity signals within a first and a second outer velocity range outside a center range of the observed radial velocity range;
a center energy sum being the sum of return energies for range cells representing radial velocity signals within the center range of the observed radial velocity range, and/or a total energy sum being the total sum of return energies of range cells representing all radial velocity signals of the observed radial velocity range; and
wherein the processing circuitry is further configured to:
classify the object/UAV track as a real UAV track or non-real UAV track based at least partly on a comparison of the determined outer energy sum with the determined center energy sum and/or with the determined total energy sum.

13. A FMCW radar system according to claim 12, wherein the processing circuitry is configured to:
classify the object/UAV track as a real UAV track or non-real UAV track based at least partly on a comparison of the determined total energy sum with a predetermined maximum energy representing a predetermined maximum radar cross-section.

14. A FMCW radar system according to claim 12, wherein the processing circuitry is configured to: classify the object/UAV track as a real UAV track when the determined outer energy sum is above a predetermined fraction of the determined center energy sum and/or above a predetermined fraction of the determined total energy sum, and when the determined total energy sum is below a predetermined maximum energy representing a predetermined maximum radar cross-section.

15. A FMCW radar system according to claim 12, wherein the processing circuitry is configured to:
   classify the object/UAV track as non-real UAV track when the determined outer energy sum is below a predetermined fraction of the determined center energy sum, wherein the predetermined fraction of the determined center energy sum is $\frac{1}{1000}$ of the center energy sum.

16. A FMCW radar system according to claim 12, wherein the processing circuitry is configured to:
   classify the object/UAV track as non-real UAV track when the determined outer energy sum is below a predetermined fraction of the determined total energy sum.

17. A FMCW radar system according to claim 13, wherein the processing circuitry is configured to: classify the object/UAV track as a non-UAV or large UAV track when the determined total energy sum is above a predetermined maximum energy representing a predetermined maximum radar cross-section, wherein the predetermined maximum radar cross-section is 1 m$^2$.

18. A FMCW radar system according to claim 12, wherein the processing circuitry is configured to:
   determine radial velocity boundaries for the center velocity range, and
   determine radial velocity boundaries for the first outer velocity range including negative radial velocity signals and radial velocity boundaries for the second outer velocity range including positive radial velocity signals, said determination of the velocity boundaries of the first and second velocity ranges being based on the radial velocity boundaries for the center velocity range and the total observed velocity range.

19. A FMCW radar system according to claim 12, wherein the processing circuitry is configured to:
   determine radial velocity boundaries for the center velocity range based on variations in observed energy levels of returned radar signals as a function of radial velocity.

20. A FMCW radar system according to claim 19, wherein the processing circuitry is configured to:
   determine a decrease in observed energy level to a local minimum on both sides of the center velocity of the observed velocity range,
   determine the radial velocity boundaries for the center velocity range as the radial velocities for which the observed energy level on both sides of the center velocity has increased by a predetermined factor from the observed local minima.

21. A FMCW radar system according to claim 12, wherein the processing circuitry is configured to:
   generate full data type radar plots based on grouping of neighboring hit range cells within one or more image lines of a full circular radar image having matching range, azimuth and radial velocity data.

* * * * *